Inventors
GOODRICH B. PRATT
JACK A. RUSSELL

Sept. 15, 1970  G. B. PRATT ET AL  3,528,733
VISUAL DISPLAY SYSTEM
Filed Aug. 22, 1966  12 Sheets-Sheet 3

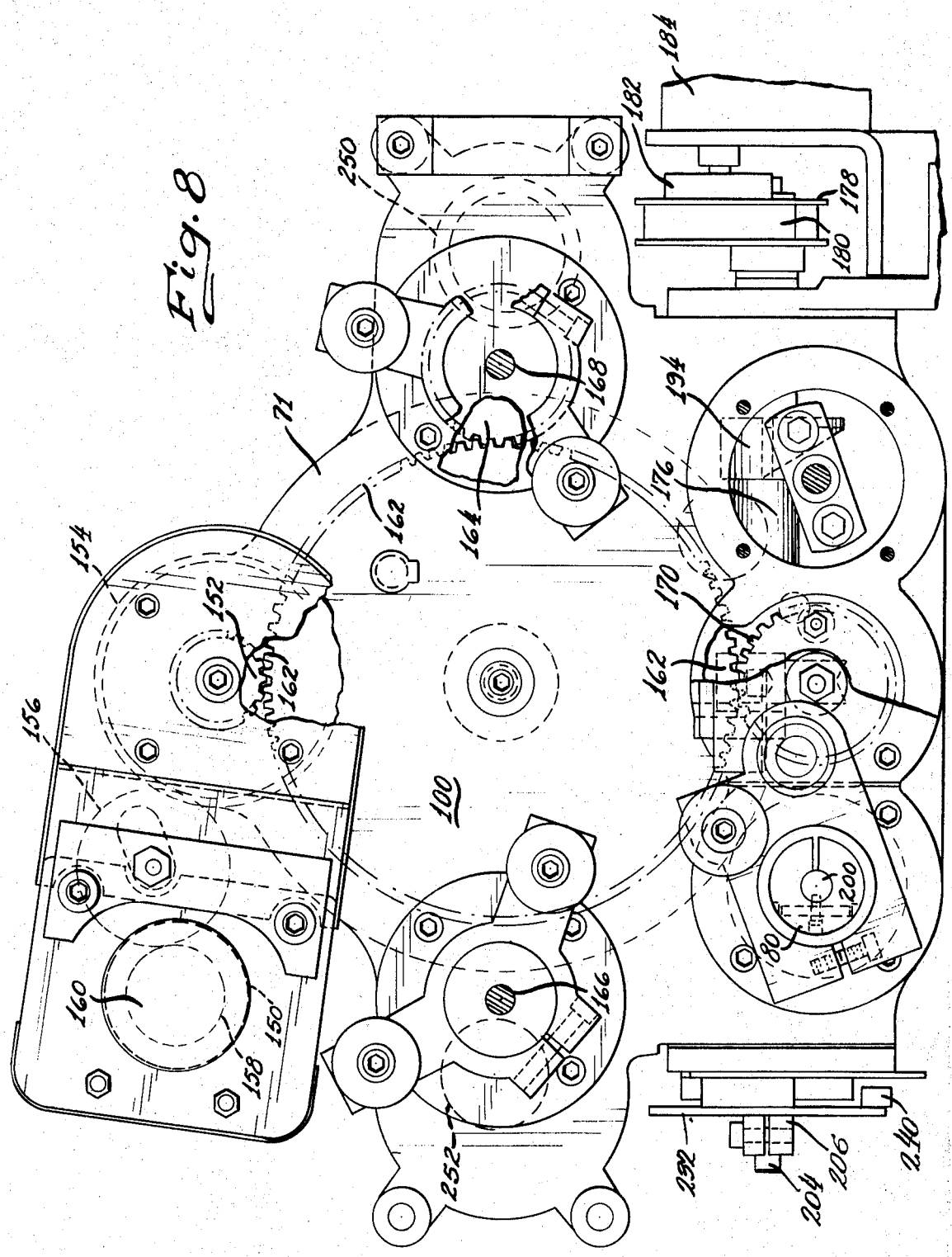

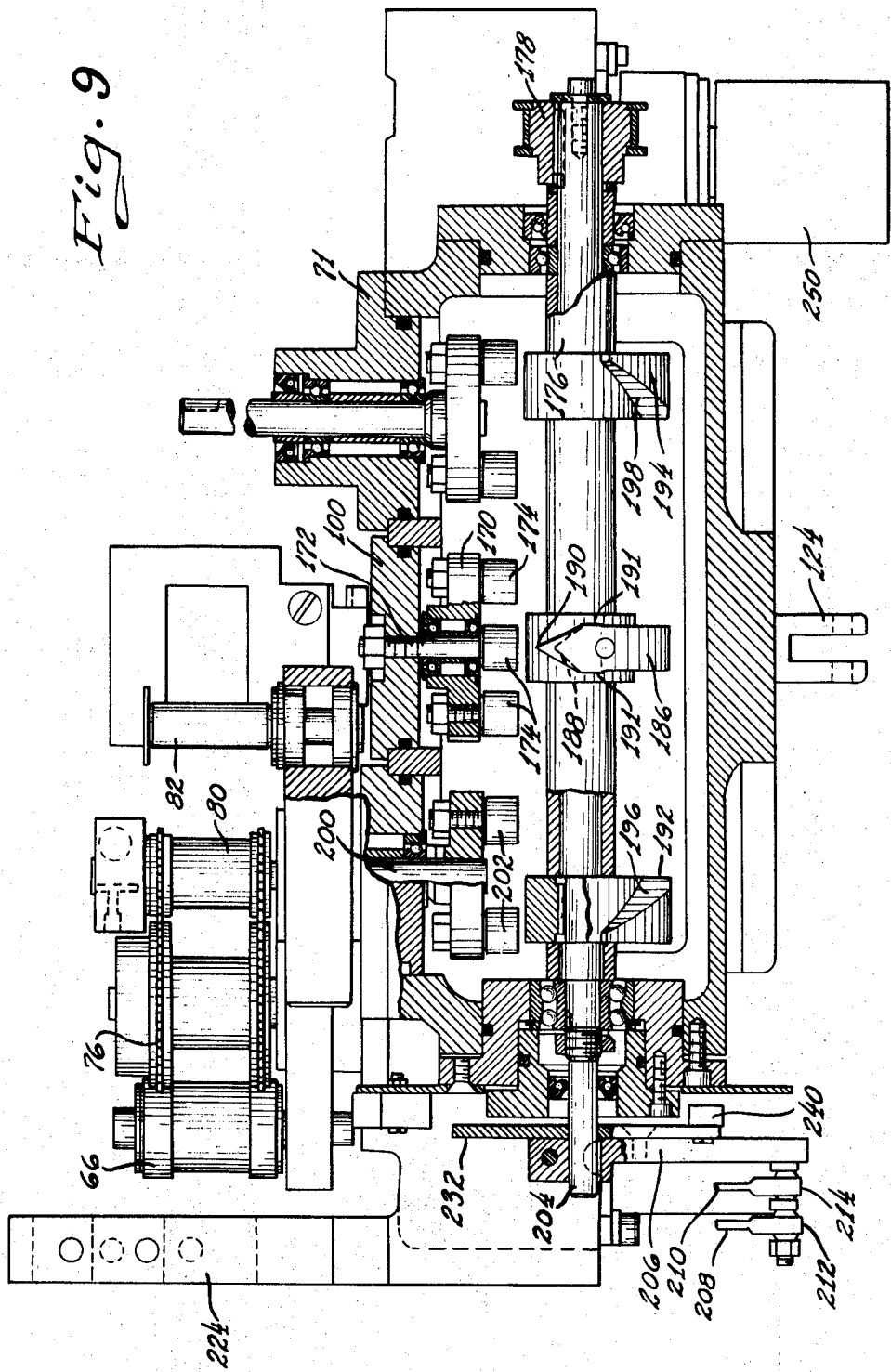

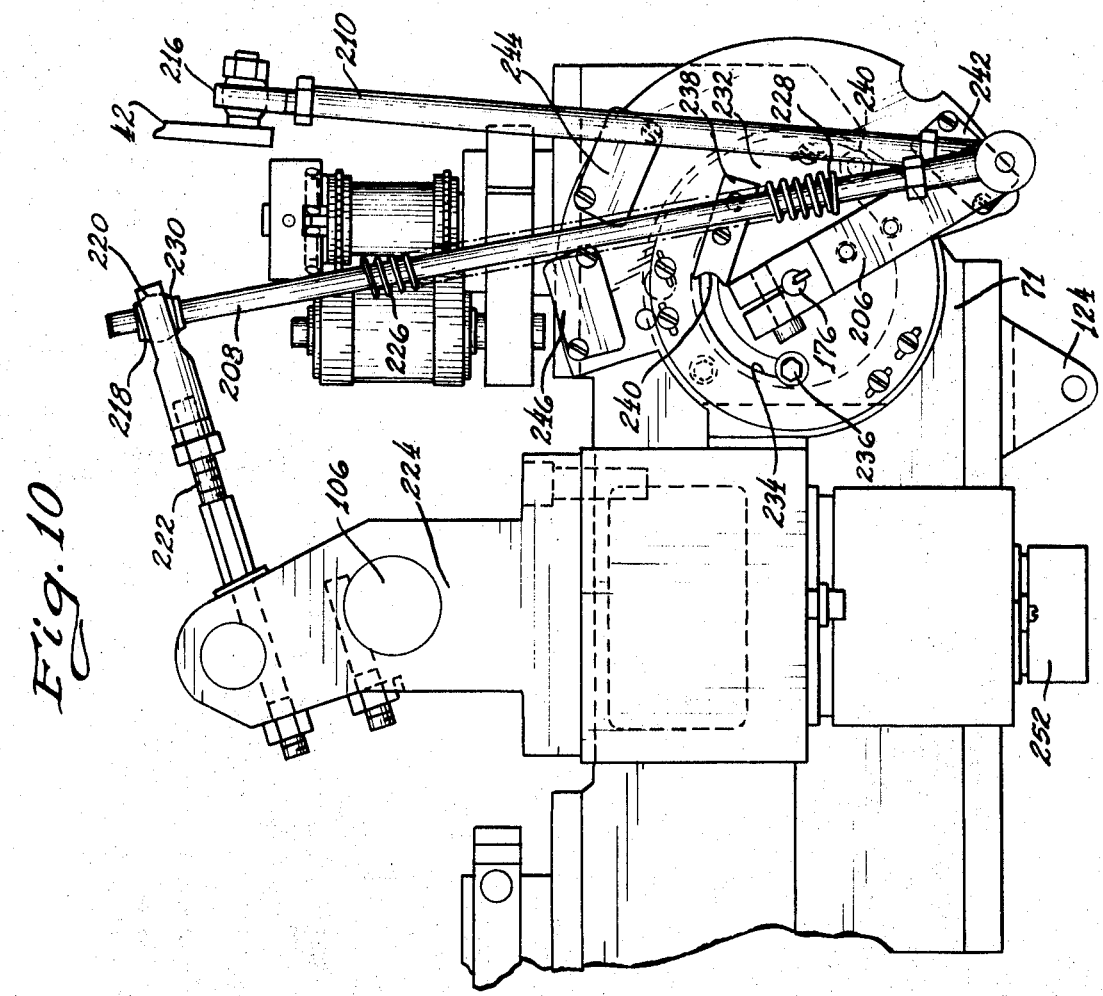

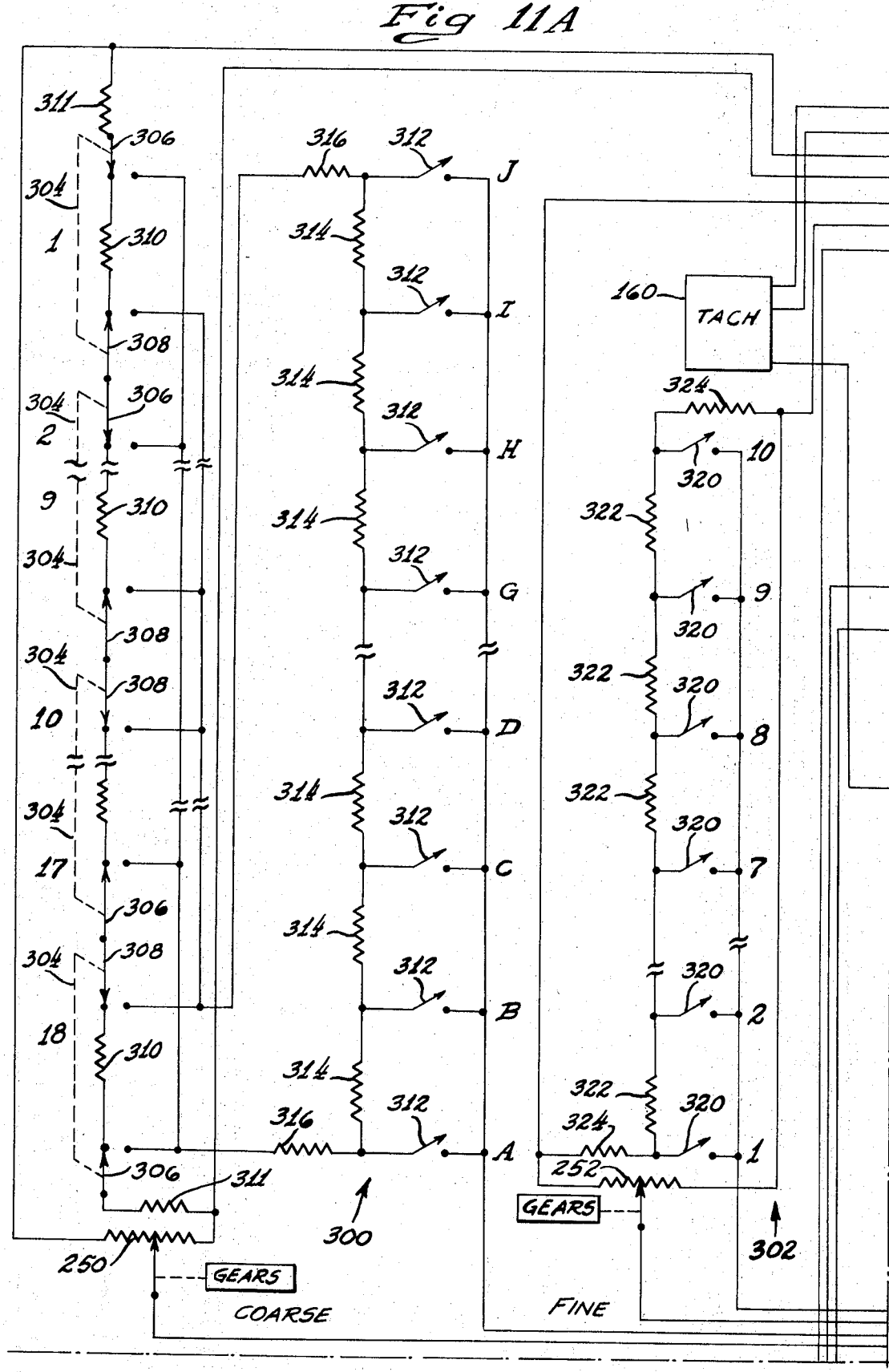

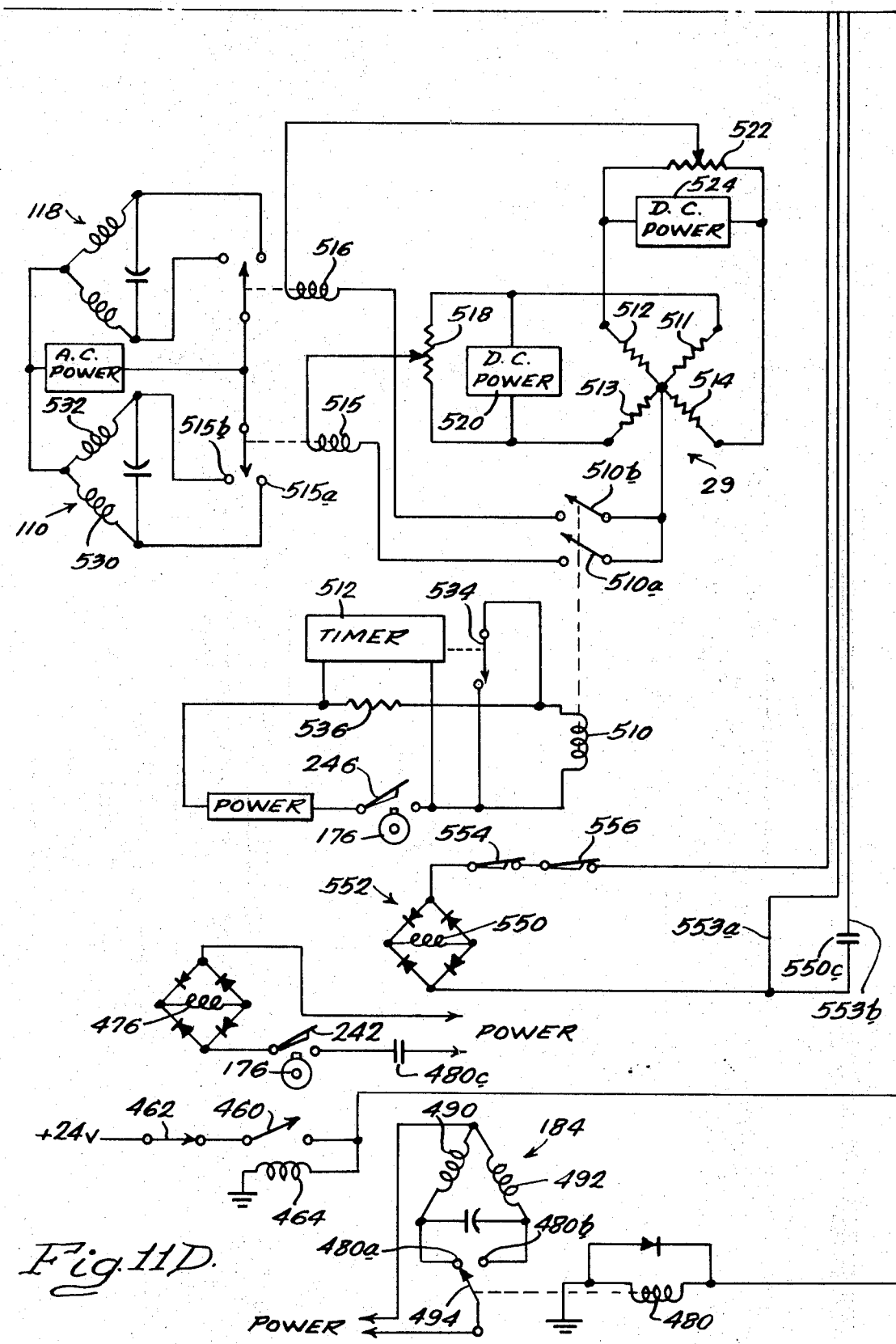

United States Patent Office 3,528,733
Patented Sept. 15, 1970

3,528,733
VISUAL DISPLAY SYSTEM
Goodrich B. Pratt, Grand Haven, and Jack A. Russell, Spring Lake, Mich., assignors to Brunswick Corporation, a corporation of Delaware
Filed Aug. 22, 1966, Ser. No. 574,218
Int. Cl. G03b 23/04
U.S. Cl. 353—25      40 Claims

ABSTRACT OF THE DISCLOSURE

A visual display system including a screen and a projector for displaying a selected one of any of a plurality of frames on the screen. The projector includes a first system for positioning a selected frame at a projection station within the projector and which operates through coarse and fine positioning modes. A second system operates to accurately position a selected frame within the projection station. Thereafter, a third system senses the position of the projected image and operates to cause the same to be accurately located at a predetermined position on the screen. The projector also includes a film tensioning mechanism which precludes distortion of the projected image without the need of a film gate. The exemplary embodiment is particularly suited for use in indoor golf games.

---

This invention relates to visual display systems, and more specifically, to visual display systems utilizing projectors.

It is the principal object of the invention to provide a new and improved visual display system.

Another object of the invention is to provide a new and improved projector for use in visual display systems.

A further object of the invention is the provision of a visual display system including a means for projecting an image on a screen, a means associated with the screen for sensing the location of the projected image thereon, and a means responsive to the sensing means for causing the projected image to be positioned at a predetermined location on the screen.

Still another object of the invention is the provision of a projector for projecting the image of any one of a plurality of frames on a screen and which includes a means for locating a selected one of the plurality of frames at a projection station such that the image thereof may be projected and including a means for moving the frames to the projection station and a control means for the moving means comprising a first servo system for providing coarse control over the moving means, a second servo system for providing fine control over the moving means and a means responsive to the conclusion of operation of the first servo system for transferring control of the moving means to the second servo system.

Yet another object is the provision of a projector such as that mentioned in the preceding paragraph wherein the frame selection system is particularly well suited for use in environments requiring random access to the frames by the provision of manually operable input means for each of the two servo systems.

More specifically, it is an object of the invention to provide a visual display system including a screen on which the image of a frame of a film may be projected, a projector including a source of light and an optical system which defines a projection station, a first positioning means for approximately positioning a selected frame on the film at the projection station, a second means for accurately positioning the selected frame on the film at the projection station, and a third means for positioning the film such that the projected image thereof will be perfectly positioned at a predetermined location on the screen.

Still another object is the provision of a visual display system such as that set forth in the preceding paragraph wherein the first means includes a first servo system for providing coarse positioning of the selected frame on the film and a second servo system for providing a fine positioning of the selected frame on the film with respect to the projection station, and wherein the second means comprise sprockets that are adapted to engage the film in a predetermined orientation with respect to each frame thereon together with means for moving the sprockets to finally position the selected frame with respect to the projection station, which means comprise a cam and cam follower arrangement, and wherein the third means includes a sensing means operatively associated with the screen for detecting the position of the projected image thereon and means responsive to the detecting means for shifting at least the selected frame on the film until the projected image is positioned at the predetermined location, the shifting of the selected frame by the third means being accomplished by moving a portion of the projector which is movably mounted.

Yet another object is the provision of a film strip projector including a novel means for precluding distortion of images projected thereby that is designed to eliminate wear on the film. Specifically, the projector includes a projection station that is unobstructed and free from film engaging elements, and means are provided on either side of the projection station for placing the film therein under tension to cause it to assume a desired configuration that will not cause distortion of the projected image.

A still further object of the invention is the provision of a visual display system including a projector wherein means are provided for performing a variety of peripheral functions with regard to the operation of the system to maximize the speed of operation, to provide safe operation thereof and to reduce the susceptibility of the system to damage caused by malfunction of the components thereof.

Other objects and advantages will become apparent from the following specification taken in conjunction with the accompanying drawings in which:

FIG. 8 is a plan view of the projector drive mechanism with portions thereof broken away;

FIG. 9 is a vertical section of the projector drive;

FIG. 10 is a fragmentary side elevation of the projector mechanism;

FIG. 11 is a block representation illustrating the relationship of FIGS. 11A–11F, inclusive, to each other; and FIGS. 11A–11F, inclusive, are schematics of the control circuit used in the system.

(I) GENERAL DESCRIPTION

Figure 1:
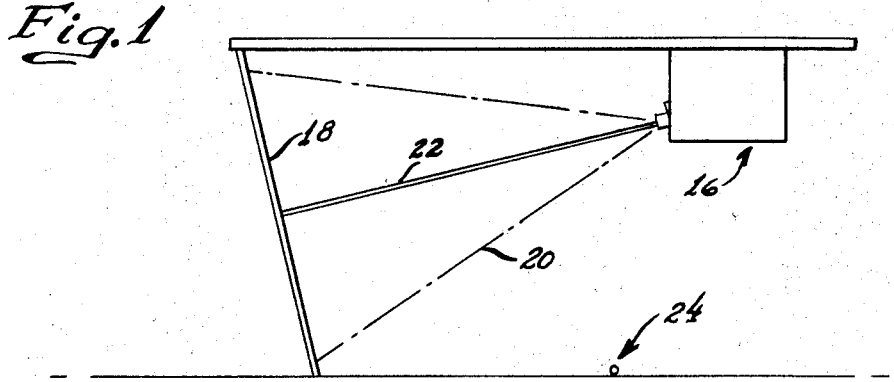
FIG. 1 is a side elevation of a visual display system embodying the invention.

The instant invention provides a visual display system including a high speed projector that is controlled such that any one of a plurality of frames on a film depicting various information may be randomly selected and displayed on a screen. As will be apparent to those skilled in the art, such visual display systems find a variety of uses such as educational teaching devices wherein a question is projected on a screen and depending upon the answer the student gives, the student is directed to display another scene on the screen that illustrates text material or additional questions. Additionally, such a projection system is also susceptible to use in many games wherein a visual display is required and which is selected as a function of the preceding play of the player. For example, in an indoor golf game, a scene depicting the view from a predetermined point on a golf course is projected on a screen, and a golfer will hit a ball toward the screen in the direction of a predetermined point on the scene projected thereon. When the golfer is to hit the next shot, the scene is changed to represent the point on the golf course at which the previous shot terminated. As will be seen, the visual display system specifically described hereinafter is particularly well suited for use with a golf game although it will be apparent that it will also find use in any environment wherein random scene selection is required such as in educational devices as mentioned previously.

In the instant system, scene selection and positioning of a scene on a screen is achieved in three steps although the first step may be considered to comprise two separate steps. Specifically, a servo system provides the first positioning step. By suitable manipulation of manually operated switches, any one of a plurality of frames may be located in a scene projection station such that the scene on the selected frame may be projected on a screen. The servo system operates in two modes. The first mode is a coarse positioning mode which moves the selected frame to anywhere within a few frames of the proper position. The second mode of servo operation causes the selected frame to be positioned within a fraction of a frame from the proper position in the frame projection station. Thus, the servo system operates to provide the first positioning step.

The second positioning step is achieved mechanically by means of a camming arrangement and is performed subsequently to the servo positioning step. The mechanical positioning step serves to position the selected frame within a few thousandths of an inch of the proper position within the scene projection station. In many uses, it is not necessary to provide a further positioning step subsequent to the mechanical positioning step just mentioned. In other words, where positioning of the selected frame to within a few thousandths of an inch provides suitable accuracy, which will be the case for most uses, it is not necessary to proceed further.

However, in certan types of indoor golf games, for example, it is desirable to have the selected scene accurately positioned on the screen. It will be apparent that if the distance from the optical position of the light source to the frame in the projection station is about one-hundredth of the distance from the frame in the projection station to the screen, any inaccuracy in positioning the frame within the projection station will be multiplied one hundred times. Thus, if the second positioning step, that is, the mechanical positioning step were to leave the selected frame about ten thousandths of an inch (0.010") from the proper position within the projection station, the projected image on the screen would be approximately one inch from the desired location thereon. As will be explained hereinafter, such an error reduces the degree of realism attainable in an indoor golf game.

Thus, the invention contemplates a third positioning step that may be used, where necessary, to accurately position the projected scene at a predetermined location on a screen. Accordingly, a sensing means is provided in a predetermined relationship with the screen and each frame of the plurality of frames that may be selected is provided with an optical discontinuity that has a predetermined relationship with the scene on the frame. The position of the optical discontinuity is sensed by the sensing means and the position of the projected scene on the screen is shifted until the discontinuity is in the proper position as determined by the sensing means. Since a predetermined relationship exists between the scene on the frame and the discontinuity, it will be appreciated that when the discontinuity is in the proper position, the projected scene will also be in the proper position on the screen.

In order to enhance the operation of the entire system, a number of peripheral functions are performed. Since the system is capable of projecting a selected one of a large number of frames on a film strip, it is desirable that the change from one frame to another be made as rapidly as possible. It was mentioned previously that such selection is done primarily by the first positioning step which includes the servo system. In the average servo system, the rate of response of the system to an input signal is directly proportional to the magnitude of the input or the error signal. Specifically, the output of the system drive will be a torque proportional to the error. As the system approaches its null point, the magnitude of the error signal decreases and the torque and the speed of the system decreases. Were such a servo system to be used for the first step of positioning, it will be apparent that for most frame-to-frame changes, the speed of the system would be at a very low percentage of the maximum speed thereof, and as a result, the length of time required to position a newly selected frame would be greatly increased over that required if the system were able to run at full speed during such positioning.

More importantly, the torque will be low and may not be sufficient to overcome friction in the system to achieve accurate positioning. If the system gain is increased, the system may simply oscillate about the null point and again accurate positioning may not be obtainable. Accordingly, the system is provided with a so-called "velocity loop" such that it will run at full speed during the vast majority of the time independently of the magnitude of the error signal and, when the null point of the system is approached, the occurrence of which indicates that the selected frame is very nearly properly positioned, the system speed (as opposed to torque) becomes dependent upon the magnitude of the error signal to provide fast and accurate positioning.

It will be appreciated that because of the presence of the velocity loop mentioned above, the system will run at very nearly full speed for much of the time. Since an exemplary embodiment of the invention contemplates the use of a film strip, it will be apparent to those skilled in the art that if the usual film gate was used at the projection station, the rather high film velocities (upward of 10 feet/sec.) due to the speed of operation of the system would cause a great deal of wear on the film strip by the film gate. However, the system contemplates unique means for providing the usual function provided by a film gate, namely, the maintaining of the film in the projection station in a planar configuration such that "oil canning" thereof is precluded to preclude distortion in the projected scene, that does not cause film wear. Specifically, idler sprockets engage the film on either side of the projection station, which is free from film engaging elements, and rotate in opposite directions to place a predetermined tension on the film in the projection station. The tension thus placed on the film strip maintains the film strip in the desired planar configuration, and the idler sprockets do not cause wear on the film in that they move with the film by virtue of their engagement therewith during the positioning of a selected frame.

Additionally, the system includes various safety features which enhance the practicality thereof. Because of the high speed of the system, it will be apparent that very slight errors in operation due to either malfunctions of the machine or erroneous operation thereof can cause significant damage to the mechanism and/or the film strip. Such safety features include a means for sensing the speed of the system which is responsive to the speed of the system surpassing a predetermined level for de-energizing the system. Additionally, a novel start-up and shut-down arrangement is provided which is arranged to insure that operation of the system cannot be initiated or shutdown except by a person who is thoroughly knowledgeable in the mode of operation thereof.

As will be seen, it is necessary to insure that the system comes completely to rest for a short time following the first stage of positioning and preceding the second stage of positioning. This is due to the fact that two separate drives are utilized for the first two positioning stages which are incompatible with each other. If both drives were to be energized simultaneously, severe damage to the system could result. Thus, the control for the system includes a means for insuring that the system has come to rest following the first or servo positioning step before the second or mechanical positioning step is initiated.

(II) SPECIFIC DESCRIPTION

(A) Environmental structure

As mentioned above, one use for the visual display system contemplated by the invention is in conjunction with an indoor golf game. Thus, the following description will be in terms of the golf game environment although it is to be understood that the system is not to be limited to use therewith. An exemplary embodiment of the projector used in the system is seen in FIG. 1 and is generally designated 16. The projector 16 is arranged to project the scene on a selected frame of a film strip onto an adjacent screen 18. The beam of light representing the projected scene is generally designated 20. A second projected beam of light 22 is used for the third step in positioning the scene accurately on the screen as will be explained in greater detail hereinafter.

Figure 2:
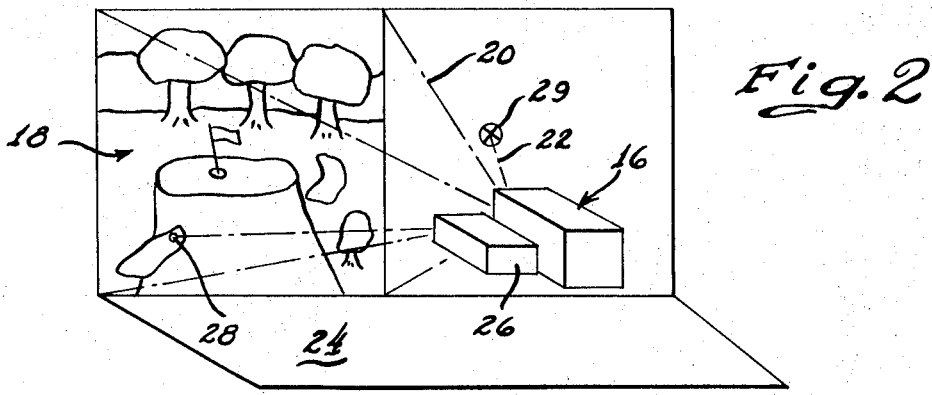
FIG. 2 is a perspective view of the system.
Figure 3:
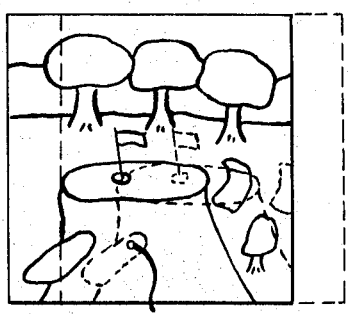
FIG. 3 is an illustration of the effect of horizontal misalignment of the scene projected on the screen.

In front of the screen is a tee area 24 from which a golfer may drive a ball toward the screen 18 during the projected scene. As is well known in the art, such indoor golf games generally include a ball spot projector which is controlled by a computer for projecting a spot of light on a screen and moving the spot of light in a manner to simulate the trajectory of the driven golf ball. Such a ball spot projector is schematically shown in FIG. 2 and is designated 26 while the spot of light projected on the screen 18 thereby is indicated at 28. As seen in FIG. 2, by means to be described hereinafter, the projected scene on the screen 18 has been located in a predetermined position thereon and the position of the ball spot 28 on the scene indicates that the golfer would have hit a ball into a trap on the left edge of a fairway. Turning now to FIG. 3, the visual effect of the scene projected on the screen 18 and the ball spot 28 thereon in the case where the scene is horizontally misaligned on the screen may be seen in solid lines. While it will be appreciated that the misalignment as indicated in FIG. 3 is exaggerated, it will be apparent that the over-all effect is the same. In the case illustrated in FIG. 3, it will be apparent that the ball spot 28, which is projected on the same point on the screen 18 independently of the position of the scene projected by the projector 16, is to the right of the trap and in the fairway. The proper position of alignment of the scene in FIG. 3 is shown in dotted lines, and thus, were the scene to be properly aligned as is the case with the illustration of FIG. 2, the ball spot 28 would show that the ball had come to rest in the trap.

Figure 4:
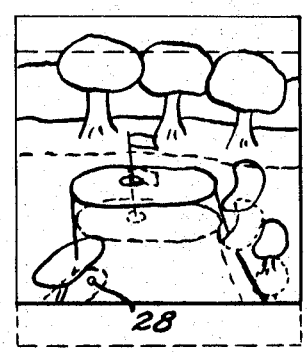
FIG. 4 is an illustration showing the effect of vertical misalignment of the projected scene.

A similar representaiton is shown in FIG. 4 wherein the scene is vertically misaligned as shown in solid lines. In this case, the ball spot 28 is seen to be short of the trap whereas if the scene were properly aligned, as shown in dotted lines, the ball spot 28 would be in the trap.

The effect of such misalignment is to detract from the realism provided by the game. For example, were the projected scene to be misaligned such as shown in FIGS. 3 and 4, the golfer, upon termination of movement of the projected ball spot 28, would be under the impression that his ball was somewhere in the fairway and not in a trap. Since such indoor golf games customarily provide the golfer with information relative to the direction of his shot and the distance thereof and may require the golfer to use such parameters to determine, on a map of a golf hole, the point where the shot terminated, the golfer on making such a determination would find that the flight of the ball did not terminate at a point on the fairway short or to the right of a trap, but rather, the ball would have come to rest in the trap. If the rules of the indoor golf game are such as to automatically assess a one shot penalty for a shot terminating in a trap, or if the rules require that the next shot made by the golfer be from a lie simulating the lie normally found in a trap, a shot which is generally considered to be more difficult than a shot from the fairway, the golfer will be disappointed with operation of the device in either one of two ways. The golfer may take the attitude that the computer has "cheated" him by computing distance and direction parameters in an erroneous manner to put him in a trap when in fact, the projected scene and projected ball spot 28 did not indicate such to be the case. Alternatively, the golfer may feel that the failure of the proper results to be displayed on the screen 18 is indicative of the inability of the game to accurately simulate an outdoor golf game. In either case, the golfer gets the feeling of lack of realism in the indoor game and thereby disregards its actual value. Obviously, if the degree of such disregard reaches a sufficient point, the golfer will not want to play the indoor golf game, and as a result, it has no commercial attraction. Therefore, the accurate positioning of the projected scene on the screen 18 is of very real significance with regard to the accuracy of realism of the game.

Returning now to FIG. 2, it will be seen that the beam of light 22 falls on a photocell quadrant 29 which serves as a sensing means for accurately aligning the projected scene on the screen 18. The photocell quadrant 29 is located in a predetermined position with respect to the proper location for the projected scene on the screen 18 and the over-all arrangement of the photocell quadrant 29 with respect to the proper location of the projected scene and the location of an optical discontinuity with respect to a scene portion 32 on the film is such that when the beam 22 is located on the photocell quadrant 29 in a predetermined manner, the projected scene on the screen 18 is properly located. Thus, when the beam of light 22 is not so located with respect to the photocell quadrant 29, the projected scene on screen 18 is not properly aligned. As will be explained in greater detail hereinafter, when tne beam 22 is not centered on the photocell quadrant 29, the photocell quadrant detects the misalignment condition and causes movement of the projected scene until the beam of light 22 is located on the photocell quadrant 29 in the predetermined manner which in turn indicates that the scene projected on the screen 18 is properly located at the predetermined position thereon.

(B) Film

Figure 5:
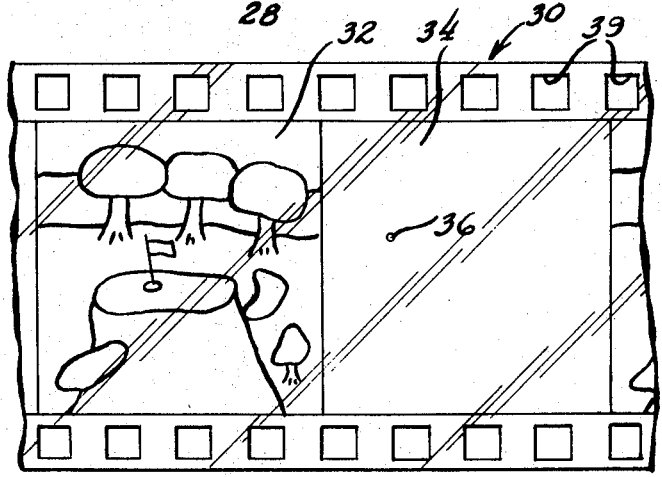
FIG. 5 is a fragmentary view of a strip of film used in the system.

Turning now to FIG. 5, there is seen a strip of film generally designated 30 which is used in the projector 16. Each frame on the film 30 includes a scene portion 32 and an alignment portion 34. In practice, the scene portion 32 may be the size of the normal frame on the film while the alignment portion 34 may be similarly sized thus forming a "double frame." However, since there is no scene on the alignment portion 34, the two together, for purposes of the instant system, are taken to comprise but a single frame.

The alignment portion 34 is generally opaque except for the optical discontinuity mentioned previously which is in the form of a transparent spot 36. The transparent spot 36 is accurately located with respect to the scene portion 32 by conventional techniques. When the scene on the scene portion 32 is projected, it will be appreciated that light from the projector light source will generally be precluded from passing through the alignment portion 34. However, a small beam of light will pass through the spot 36, which beam of light, in fact, comprises the beam of light 22.

The film 30 also includes a plurality of sprocket engaging apertures 39. For reasons that will become apparent hereinafter, it is desirable that the number of apertures 39 per frame be an integer.

Figure 6:
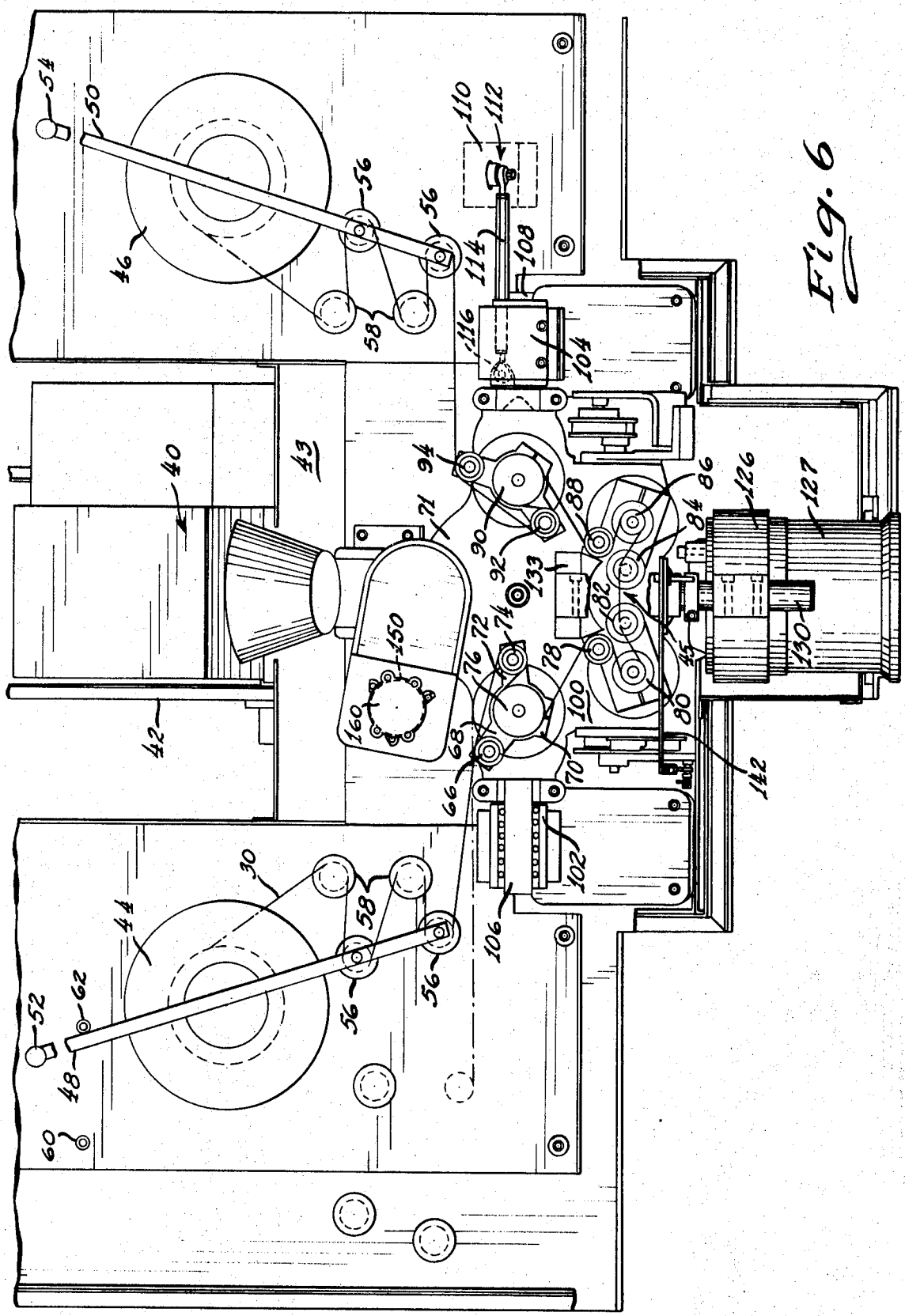
FIG. 6 is a plan view of the projector used in the system.

(C) Projector mechanical structure (1) *Light source.*—Turning now to FIG. 6, the details of the projector 16 may be seen. The projector 16 includes a source of light, generally designated 40, which may be a conventional arc lamp. The projector 16 includes a frame generally designated 43 which may be a thick metal plate which mounts a pair of rails 42. The arc lamp 40 in turn is mounted on the rails 42 for movement toward or away from a film projection station or plane 45 in which a frame on the film 30 may be disposed for projection of the scene thereon onto the screen 18. The film projector plane is defined by an unobstructed area along the path of film movement and between the arc lamp 40 and a lens system described hereinafter. If desired, a suitable adjustment screw (not shown) may be used to control the movement of the arc lamp 40 on the rails 42.

(2) *Film take-up storage mechanism.*—Flanking the arc lamp 40 on either side thereof are a pair of film take-up and storage reels 44 and 46 respectively. The reels 44 and 46 are independently driven by a pair of bi-directional motors of conventional construction (not shown). Also mounted on either side of the arc lamp 40 are a pair of dancer arms 48 and 50, respectively, which are mounted on respective shafts 52 and 54 in a direction transverse to the axis of rotation thereof. The shafts 52 and 54 are rotatably mounted on the projector frame 43 and form part of a conventional system for controlling the speed of the motors driving the reels 44 and 46. The motor speed control systems may be conventional and form no part of the invention. However, for the sake of clarity it should be noted that such systems control the speed of the reel drive motors in response to the position or the change of position of the associated dancer arm 48 or 50.

Each dancer arm 48 and 50 mounts a pair of idler rollers 56. Additionally, the projector frame 43 supports two pairs of idler rollers 58, there being one such pair of idler rollers 58 for each of the dancer arms 48 and 50. When the speed at which the film 30 is driven through the film projection plane 45 is less than the speed at which the film 30 is being unrolled from one of the reels 44 and 46, the excess film 30 will be taken up momentarily by movement of one of the dancer arms 48 or 50 which will thereby cause a change in the speed of the reel drive motor for the associated reel. The speed of the reel drive will continue to change until the two speeds are in relative synchronization. Similarly, when the film 30 is being drawn through the film projection plane 45 faster than it is coming off one of the reels 44 and 46, the resultant change in position of the corresponding dancer arm 48 or 50 will cause the associated reel drive motor to speed up until the two speeds are sychronized. Similar action will occur during take-up of the film 30 on the reels 44 and 46.

In order to preclude too great of an excursion of a dancer arm 48 or 50, a pair of limit abutments 60 and 62 may be associated with each of the dancer arms 48 and 50. As will be seen, means may be provided to preclude operation of the film drive in the event a dancer arm is up against one of the limit abutments 60 or 62.

(3) *Film path.*—FIG. 6 also illustrates the path of the film 30 from one reel to the other. Starting from the left-hand side of FIG. 6, it will be seen that the film 30 is threaded about the idlers 56 and 58 associated with the dancer arm 48 which controls the speed of the reel 44. The film coming off of the idlers 56 on the dancer arm 48 is led to an idler 66 mounted on an arm 68 of a yoke 70 which is adjustably mounted on a projection on a housing 71 for the drive mechanism. The yoke 70 includes a second arm 72 which rotatably mounts a second idler 74 about which the film 30 is, in turn, trained. In the center of the yoke 70 is located a capstan drive sprocket 76 which drives the film 30 through the film projection plane 45. As the film comes off the idler 74, it is trained about the drive sprocket 76 and is looped about still another idler 78 to be trained about an idler sprocket 80. As will be seen hereinafter, the idler sprocket 80 serves as a portion of a film tensioning mechanism which is arranged to minimize wear on the film while precluding distortion of the projected scene on the screen 18 due to "oil canning" of the film in the film projection plane 45.

From the idler sprocket 80, the film is trained about another idler 82 which has a cylindrical surface which contacts the film across its entire width. The idler 82 also forms part of the film tensioning mechanism. The film 30 comes off the idler 82 through the film projection plane 45 to a similar and symmetrically placed idler 84. From the idler 84, the film is trained about an idler sprocket 86, which is similar in structure and purpose to the idler sprocket 80, then an idler 88 which is similar and symmetrically placed with respect to the idler 78, about a capstan drive sprocket 90 which is identical to and symmetrical with the drive sprocket 76, about idlers 92 and 94 which are identical to the idlers 74 and 66, respectively, and may be symmetrically placed with respect thereto. Of course, whether such is the case depends upon the adjustment of the angular position of the corresponding yoke 70 on the projection from the drive housing 71. The film is then run through the reel 46 via the idlers 56 and 58 associated with the dancer arm 50.

A bi-directional motor and gear transmission drive the drive sprockets 76 and 90 during the scene selection process in a manner to be described in greater detail hereinafter.

(4) *Drive housing movement.*—With the exception of the idlers 56 and 58, the various idlers and sprockets are directly or indirectly mounted on the upper side 80 of the drive housing 71. Mounted on the frame 43 of the projector 16 and on either side of the film projection plane 45 is a pair of ball bearings 102 and 104, respectively, which are both of the type to permit combinations of linear and radial movement. Each of the bearings 102 and 104 receive respective stub shafts 106 and 108 which are coaxially mounted on the drive housing 71 at a point thereon below the projection plane 45. Thus, it will be apparent that the drive housing 71 is mounted for shiftable movement to the right or the left as seen in FIG. 1 or may rotate about the longitudinal axes of the stub shafts 106 and 108. Since the film projection plane 45 is displaced vertically and horizontally from the longitudinal axes of the stub shafts 106 and 108, rotation of the drive housing 71 about the longitudinal axes of the stub shafts 106 and 108 will cause up or down movement of the film projection plane 45. Thus, the film projection plane 45 is located for right-left and up-down movement and combinations thereof. This construction is utilized in the third positioning step which, it will be recalled, accurately positions the projection image at a predetermined location on the screen 18.

In order to provide right-left movement of the drive housing 71, a torque motor 110 is mounted on the projector frame 43. The output shaft of the torque motor 110 includes an eccentric and universal connection, generally designated 112, to an adjustable link 114 which has its opposite end universally, pivotally connected to a lug 116 on the right side of the drive housing 71. As a result, rotation of the shaft of the torque motor 110 in response to energization thereof will cause right-left movement of the drive housing 71 in response to right-left movement of the adjustable link 114 caused by the eccentric connection 112.

Figure 7:
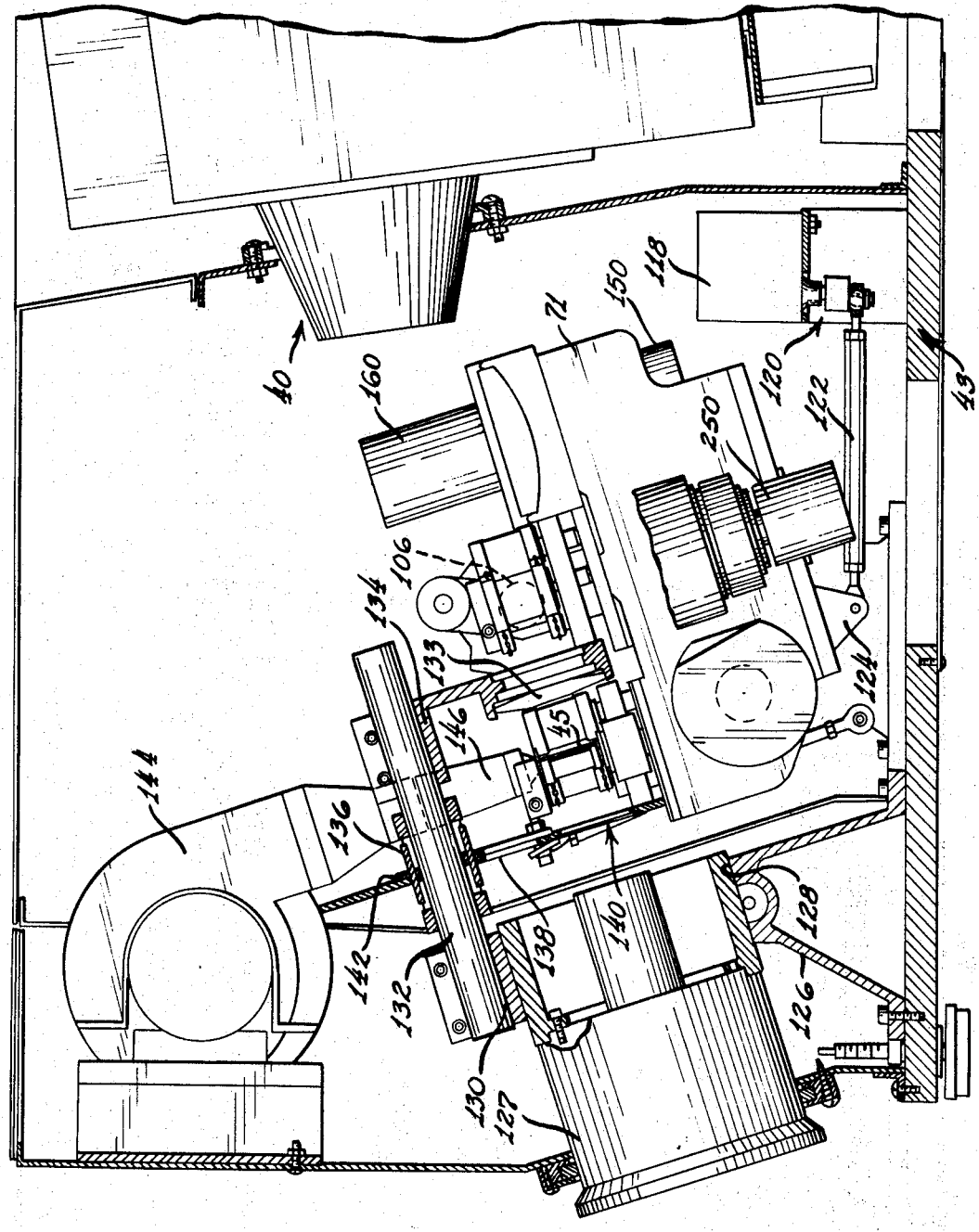
FIG. 7 is a side elevation of the projector with parts thereof shown in section.

Turning now to FIG. 7, a similar torque motor 118 has a similar eccentric and universal connection, generally designated 120, to a similar adjustable link 122. The link 122 is universally, pivotally connected to a lug 124 on the under side of the drive housing 71. Thus, as a result of energization of the torque motor 118, the drive housing 71 will be rotated slightly about the pivotal axes of the stub shafts 106 and 108 to cause up-down movement of the film projection plane 45. In practice, the amount of movement required of the drive housing 71 is very small because of the multiplying effect mentioned previously in conjunction with misalignment of the projected image. Thus, no provision need be made for movably mounting the film take-up system.

(5) Optics.—Referring to FIG. 7, a yoke-like collar 126 is mounted on the projector frame 43. An opening 128 in the collar 126 is used to support a suitable lens system 127 which is utilized to focus the projected scene on the screen 18. The collar 106 may be provided with conventional means for adjusting the position of the optical system 127.

The collar 126 includes a second opening 130 adjacent its upper end for supporting a shaft 132 which projects generally rearwardly toward the arc lamp 40. A conventional condensing lens system 133, by means of a suitable collar 134 adjustably mounted on the shaft 132, is supported in a position between the arc lamp 40 and the film projection plane 45.

A sleeve 136 is also rotatably mounted on the shaft 132. The sleeve 136 in turn mounts an arm 138 which supports a douser lens 140. A second arm 142 is secured to the sleeve 136 and serves as a control arm for rotating the sleeve 136 about the shaft 132 so as to ultimately cause the douser lens 140 to be disposed in the optical path between the film projection plane 45 and the optical system 127 which is used for focusing purposes. The function of the douser lens 140 is to cause defocusing of the projected image during the time in which the film 30 is being positioned in the film projection plane 45. Of course, if desired, an opaque mask could be used in place of the douser lens 140 such that during film positioning, no light whatever would reach the screen from the arc light 40. In many instances, the latter arrangement is preferable.

As will be seen, the arm 142 is operated during film positioning to interpose the douser lens 140 in the light path. When the film has been positioned in the film projection plane 45, the arm 142 is operated to withdraw the douser lens 140 from the light path such that the scene on the selected frame will be projected and focused on the screen 18.

(6) Film cooling.—A centrifugal blower 144 may be suitably mounted on the projector frame 43 above the shaft 132 and includes an outlet nozzle 146 disposed just above the film projection plane 45. The blower 144 preferably is electrically connected to be operated whenever the arc lamp 40 is energized to direct a continuous stream of air against the portion of the film 30 located in the film projection plane 45 to cool the latter.

(7) Film Drive.—Turning now to FIGS. 7 and 8, the film drive system will be explained. A film drive motor 150 is mounted on the underside of the drive housing 71. The drive motor 150 may comprise a conventional, bi-directional high speed servo motor and has a gear 158 mounted on its output shaft and is in mesh with an idler gear 156. The idler gear 156 in turn drives a first gear 154 which is mounted on a shaft mounting a second gear 152. Through a suitable flexible coupling (not shown) the gear 158 is coaxially linked to the shaft of a conventional tachometer 160 which is utilized in the velocity feedback loop mentioned previously for use in controlling the speed of the system as will be more specifically described hereinafter.

Returning to the second gear 152, a gear 162 is in mesh therewith and is also in mesh with a pair of gears 164 (only one of which is shown). The gears 164 drive respective shafts 166 and 168 which are connected to the drive sprockets 76 and 90 respectively. Thus, when the servo motor 150 is energized, the drive train provided by the gears 152, 154, 156, 158, 162 and 164 will cause the film drive sprockets 76 and 90 to be driven in the same direction at equal speeds and is used as the drive system during the first or servo step of film positioning.

The gear 162 is also meshed with a gear 170 which provides the drive input during the second stage or mechanical step of film positioning. As best seen in FIG. 9, the gear 170 is mounted for free rotation about a shaft 172 which is secured to the upper side 100 of the housing 71. Depending from the lower surface of the gear 170 are four cam followers 174 (only three of which are shown) radially spaced about the rotational axis of the gear 170 at intervals of 90 degrees. Rotatably mounted within the drive housing 71 is a cam shaft 176 having a drive sprocket 178 on an end thereof protruding from the drive housing 71. A timing belt 180 (see FIG. 8) is trained about the sprocket 178 and a second sprocket 182 that is mounted on the output shaft of a torque motor 184. The torque motor 184 is suitably secured to the drive housing 71 and it will be apparent that rotation of the output shaft of the torque motor 184 will cause rotation of the cam shaft 176.

Centrally mounted on the cam shaft 176 is a cam 186 having a pointed cam surface 188. The apex 190 of the cam surface 188 is arranged to pass through the axis of rotation of the gear 170 at some point during the rotation of the cam shaft 176. As a result of this construction, when the cam shaft 176 is rotated and the cam 186 encounters one of the followers 174, the follower 174 so engaged will be cammed either to the right or to the left as seen in FIG. 9 depending upon its initial position with respect to the center line of the gear 170 until the follower abuts either of the side surfaces 191 of the can 186. This action will cause a rotation of the gear 170 which in turn will rotate the gear 160 to ultimately rotate the film drive sprockets 76 and 90, thereby shifting the position of the film strip within the film projection plane 45. This mechanism is utilized to achieve the second or mechanical film positioning step.

Of course, in order to achieve relatively precise positioning of a selected frame within the film projection plane 45, it is necessary that certain relationships between the cam 186, the followers 174, the gears 162, 164 and 170, the number of film engaging teeth on the film drive sprockets 76 and 90 and the number of sprocket receiving apertures 39 on the film strip exist. As pointed out previously, each frame on the film strip 30 is a "double frame." That is, its length is twice that of the ordinary frame on a corresponding type of film. The exemplary embodiment of the invention utilizes 35 millimeter film and as a result, it will be apparent that the length of the frame is 1.500 inches and that there are eight sprocket tooth receiving apertures 39 (FIG. 5) for each such frame on the film 30. Each of the film drive sprockets 76 and 90 include thirty-two film engaging teeth such that a complete revolution of the film drive sprockets 76 and 90 will advance the film 30 a distance equal to four frame lengths. The ratio between the gears 162, 164 and 170 is 3:1:1. Thus, it will be apparent that one revolution of the gear 170 will cause a single revolution of the gears 164 to advance the film 30 four frame lengths.

As mentioned previously, the second portion of the first or servo positioning step, namely, the fine servo positioning step, is sufficiently accurate to locate the selected frame within a fraction of a frame length from the proper position in the film projection plane 45. It has been found that generally, the conclusion of the fine servo positioning mode will result in the selected frame being within about one-tenth of a frame from the proper position within the film projection plane 45. Thus, it will be apparent that it is necessary that the action of the cam 186 on a follower 174 produces sufficient rotation of the gear 170 to cause a film movement of at least one-tenth of a frame. However, in order to provide for some margin of error as well as to facilitate the use of somewhat lower quality of electrical components in the servo system, the mechanical positioning mechanism is designed to handle any situation wherein the selected frame is within one-third of a frame from the proper position in the film projection plane 45. Since one complete revolution of the gear 170 will produce a four-frame movement, it will be apparent that the gear 170 must be capable of movement by the cam 186 through 30 degrees to produce the maximum one-third of a frame movement of the film. Thus, the width of the cam 186 must be such that if the center line thereof were in the same vertical plane as the center line of the follower 174 with which it is engaged, it would deflect the follower 174 to the right or to the left a distance sufficient to rotate the gear 170 through 30 degrees.

It will also be apparent that in order for the selected frame to be very accurately positioned within the film projection plane 45, the distance between the closest point on the surfaces of adjacent cam followers 174 should be approximately equal to the width of the cam 186. If such is the case, it will be appreciated that if the film is not properly positioned within the film projection plane 45 as a result of the first or servo positioning step, the mechanical relation of the cam followers 174 to the cam 186 will be such that the cam 186 cannot be rotated without engaging one of the cam followers 174 to thereby cause proper positioning of the film within the film projection plane 45. It will also be apparent that the relationship just mentioned between the closest points on the surfaces of adjacent cam followers 174 will permit the cam 186 to be snugly interposed between adjacent followers 174 when the mechanical positioning has been accomplished. The snug fit substantially locks the gear 170 against rotation and thereby effectively locks the remainder of the drive system against rotation to ultimately lock the selected frame on the film 30 in the proper position within the film projection plane 45. It has been found that by fabricating the various components used in the drive system with relatively close, but easily attainable, tolerances according to current manufacturing techniques, a 35 millimeter film strip bearing the selected frame thereon will be positioned such that the selected frame will be within 0.010 inch of the proper position within the film projection plane after the second or mechanical stage of film positioning has been performed.

(8) Film tensioning.—The cam shaft 176 also forms part of a film tensioning device which operates upon the film within the film projection plane 45 to cause the film therein to be disposed in a single plane to thereby preclude distortion of the projected image. A pair of cams 192 and 194 are mounted on the cam shaft 176 as part of the tensioning mechanism. The cams 192 and 194 have diagonal cam surfaces 196 and 198, respectively, which are arranged symmetrically with respect to each other about the cam 186. Since the action of the cams 192 and 194 and the cooperating structure for each is identical, only one will be described.

A shaft 200 is rotatably mounted in the upper side 100 of the drive housing 71 and is connected to the idler sprocket 80. A pair of cam followers 202 are mounted on the lower end of the shaft 200 at radial intervals of 180 degrees and are alternatively adapted to be engaged by the cam surface 196. When the cam shaft 176 is rotated by the torque motor 184, the cam 186, which has its cam surface 188 mounted in advance (in a counterclockwise direction as viewed from the left) of the cam surfaces 196 and 198 of the cams 192 and 194, will cause positioning of a frame on the film 30 in a manner just described. After such positioning of the film 30 has taken place, the shaft 200 will be disposed in the position shown in FIG. 9 (or rotated 180 degrees therefrom). This orientation is caused by action of the movement of the film 30 on the idler sprocket 80. The idler sprocket 80 includes sixteen film engaging teeth such that one revolution thereof corresponds to movement of the film 30 through a distance equal to two frame lengths. Furthermore, when the film is initially placed on the projector 16, it is placed with a frame in the film projection plane 45 and the idler sprocket 80 is arranged with respect to the film in such a position that the shaft 200 and the followers 202 thereon are at 90° to the position shown. As a result, one of the cam followers 202 will be positioned to be engaged by the cam surface 196 when the cam shaft 176 is rotated a predetermined amount. When the cam surface 196 encounters a cam follower 202, it will cause the shaft 200 to be rotated clockwise as seen in FIGS. 6 and 8. As a result, the idler sprocket 80 will also be rotated clockwise and since the teeth thereof are engaged in the apertures 39 of the film 30, there will be a tendency to move the frame of the film within the film projection 45 out of the film projection plane 45 in the general direction of the idler sprocket 80. The cam 194 causes an equal and counterclockwise rotation of the idler sprocket 86 such that the latter attempts to move the selected frame out of the film projection plane 45 in the direction of the idler sprocket 86, which, of course, is opposite to the direction from the film projection plane 45 toward the idler sprocket 80. As a result of the equal and opposite forces applied to the film 30 within the film projection plane, the film 30 has tension applied thereto.

As mentioned above, on either side of the film projection plane 45 are a pair of cylindrical idlers 82 and 84 which are also intermediate the idler sprockets 80 and 86. The cylindrical surface of the idlers 82 and 84 serves as a guide means and is such as to maintain the film therebetween in a single plane. However, as is well known, no matter how a film is held at its ends, it will often tend to "oil can" in the center thereof. However, it has been found that when tension is applied to the film, the "oil canning" effect is eliminated and thus, distortion of the projected image due to "oil canning" of the film in the film projection plane 45 is eliminated. Thus, the film within the film projection plane 45 is maintained in a single plane for projection without the use of a film gate. Since the film contacting portions of the tensioning mechanism just described are all mounted for rotation and thus are driven with the film 30, it will be apparent that there is substantially no sliding contact between the film and the film tensioning mechanism as would be the case if a film gate were to be used. This feature is particularly significant in view of the relatively high speed of the film during film frame selection because the friction due to a sliding engagement would cause rapid deterioration of the film due to wear. Additionally, the nature of the tensioning system also compensates for wear in the sprocket receiving apertures 39 in the film 30 as well as expansion and contraction of the film due to temperature and humidity variations.

(9) Douser control and film tension limiter.—In order to control the douser lens 140 and limit the tension applied to the film 30 by action of the cams 192 and 194 through the idler sprockets 80 and 86, a second projecting end 204 (FIG. 9) of the cam shaft 176 mounts an arm 206 exteriorly of the drive housing 71. A pair of adjustable links 208 and 210 are universally, pivotally connected at 212 and 214, respectively to the arm 206. As best seen in FIG. 10, the link 210 is also universally, pivotally connected at 216 to the control arm 142 for the douser lens 140 (FIG. 7). Accordingly, when the cam shaft 176 is rotated clockwise as seen in FIG. 10 to cause film positioning and tensioning as described above, the control arm 142 will be moved upwardly to pivot the douser lens 140 about the shaft 132 (see FIG. 7) out of the light path between the film projection plane 45 and the optical system 127 thereby permitting an image to be focused on the screen 18.

The arm 208 has its upper end slidably received in a ball 218 of a ball-and-socket joint 220 mounted on an arm 222. The arm 222 is connected to a mounting member 224 mounted on the projector frame 43. A compression spring 226 is mounted about the arm 208 and maintained in a slightly elevated position thereon by a rigid washer 228 secured to the lower end of the arm 208. Thus, when the cam shaft 176 is rotated counterclockwise as seen in FIG. 10, the link 208 will slide within the ball 218 as the link 208 is moved upwardly by the action of the arm 206. When the compression spring 226 encounters a washer 230 affixed to the underside of the ball 218, the spring 226 will begin to be compressed and thereby offer resistance to further rotation of the cam shaft 176. When the force exerted by the spring 226 is equal to the force applied to the cam shaft 176 by the torque motor 184, the torque motor 184 will stall and the cam shaft 176 will not be further rotated in a counterclockwise direction. This rotation limiting action on the cam shaft 176 prevents the tension applied to the film 30 by the idler sprockets 80 and 86 (FIG. 1) from exceeding a predetermined value. In this respect, it has been found that a tensioning force of about two pounds is sufficient to prevent "oil canning" of the film 30 in the film projection plane 45 and is sufficiently low so as to preclude damaging of the film 30 due to excessive tensioning thereof by the idler sprockets 80 and 86.

(10) Film tension limiter back-up.—A circular plate 232 is also secured to the end 204 of the cam shaft 176 for rotation therewith. As best seen in FIG. 10, the plate 232 includes an arcuate slot 234 which receives a stationary lug 236 or screw mounted on the side of the housing. Adjustably mounted on the plate 232 is an abutment strap 238 having an end 240 disposed with respect to the slot 234 so as to provide an abutment surface. The strap 238 may be adjustably secured to the plate 232 in any suitable manner and serves as an adjustable stop for the cam shaft 176. If for some reason the compression spring 226 does not offer sufficient resistance to stall the torque motor 184 which drives the cam shaft 176, further rotation of the plate 232 will cause the end 240 of the strap 238 to encounter the lug 236 thereby precluding further rotation of the cam shaft 176. In operation, the strap 238 is suitably adjusted on the plate 232 with respect to the slot 234 in the abutment 236 to preclude the cam shaft 176 from rotating to a point where the sprockets 80 and 86 would damage the film 30. The end of the slot 234 opposite the strap 238 also serves as an abutment to limit clockwise rotation of the cam shaft 176 to a point wherein the cams 186, 192 and 194 are moved to a position where they cannot engage their respective followers. When this limit of rotation is reached, the torque motor 184 merely stalls.

(11) Electro-mechanical control structure.—The plate 232 additionally mounts a cam surface 240 which may be used to actuate microswitches 242, 244 and 246 (FIG. 10) for timing purposes, as will appear.

Turning to FIGS. 8, 9 and 10, the relation of a portion of the electrical control system to the drive mechanism may be observed. A potentiometer 250, which may be of multiple turn type, has its wiper connected through suitable gearing (not shown) to a gear on the shaft 168 (FIG. 8). Thus, the driving of the film through the film projection plane 45 by the servo motor 150 will cause a change of position in the wiper arm of the potentiometer 250 so as to provide a suitable coarse frame position feedback signal. The wiper of the potentiometer 250 is driven by the gearing to a unique position for each frame on the film, which, in the exemplary embodiment of the invention, number about 1800. However, due to the customary lack of absolute perfection in such a device, the potentiometer 250 is not sufficiently sensitive to provide 1800 discrete increments of resistance although it is capable of providing 180 such increments. Accordingly, a second potentiometer 252 is provided which has its wiper connected thru gearing (not shown) to the lower end of the shaft 166. As a result, the wiper of the potentiometer is also positioned by the drive and provides a fine frame position feedback signal. Specifically, the potentiometer 252 has its wiper arranged to be driven to ten unique positions, one for each frame, in a group of 10 adjacent frames, there being 180 such groups. Accordingly, the two potentiometers provide a distinct combination of resistance increments for each of the 1800 frames on the film 30.

(D) System control

Turning now to FIGS. 11A–11F, inclusive, there is seen a schematic of an electrical control system for controlling scene selection and the various functions of the projector system. FIGS. 11A–11F are oriented with respect to each other as shown in FIG. 11.

(1) Scene selection.—For scene selection purposes, there are provided a pair of bridge networks 300 and 302 for coarse servo film positioning and fine servo film positioning, respectively, as seen in FIG. 11A. As mentioned previously, one exemplary use of a projector made according to the invention is in the environment of an indoor golf game. When the projector is used with a golf game, the film is provided with eighteen hundred frames, one hundred frames for each of eighteen holes on a golf course. The coarse film positioning bridge 300 is utilized to position the selected frame within plus or minus three frames of the proper position in the film projection frame. The fine film positioning bridge 302 is then used to position the selected frame within plus or minus one-tenth of a frame with respect to the film projection plane 45 although it will be apparent from the foregoing description of the mechanical positioning system, the required sensitivity of the bridge 302 need only be sufficient to position the selected frame within plus or minus one-third of a frame in the film projection plane 45.

Specifically, the coarse film positioning bridge 300 is comprised of the multiple turn potentiometer 250 and a plurality of individual resistances which may be introduced into the circuit by depression of push buttons which operate switches. In a golf game environment, the coarse positioning bridge 300 includes eighteen push buttons (portions of five of which are shown schematically), each corresponding to a hole on the golf course although rotary switches or other manually operated means could be used. Additionally, the coarse positioning bridge 300 includes ten additional switches, only eight of which are illustrated. The eighteen push buttons are indicated at 304 and each operates a pair of SPDT switches 306 and 308. The switches 306 and 308 associated with each push button 304 are ganged so as to be operated simultaneously upon the depression of the corresponding push button 304. Resistors 310 are interposed between the normally closed contacts of corresponding SPDT switches 306 and 308 and similar resistances 311 are connected to the common side of the switches 306 at either end of the array of push buttons 304. The normally open contacts of the switches 306 are connected in common as are the normally open contacts of the switches 308. These respective common connections are connected to opposite sides of a resistor and switch array forming the remainder of the coarse film positioning bridge. This latter array is comprised of ten SPST switches 312 (only eight of which are shown) having their normally open contacts connected in common. The switches 312 may be operated by corresponding push buttons not shown. Resistors 314 are interposed between the blade side of adjacent ones of the switches 312 and the junction of the resistors 314 and the blades of the switches 312 on opposite sides of the array are returned through resistors 316 to the common connection between the normally open contacts of the switches 306 and 308.

The resistors 310 and 314 are selectively placed in the circuit by manipulation of the appropriate switches to provide a signal which is utilized for the selection of an appropriate scene. In actuality, manipulation of the push buttons 304 provides a rough selection of the scene, namely by selection of a group of 100 frames. Manipulation of the switches 312 is used to provide resolution within the group of 100 scenes selected by manipulation of the switches 304 to a group of about 10 frames. Accordingly, the resistance provided by one of the resistors 314 should be approximately one-tenth of that provided by one of the resistors 310. The resistors 311 are placed in the circuit merely to provide a safety factor when a scene is selected near either end of the film strip to preclude the possibility of system overshoot to the point of running past the end of the film. Preferably, the resistors 311 have a value approximately two and one-half times that of the resistors 310. The resistors 316 are provided merely to "center" the effect of the resistors 314 and the switches 312 within the scene range provided by manipulation of the switches 306 and 308. Accordingly, the value of the resistors 316 should be approximately one-half of that provided by the resistors 314.

As mentioned previously, the remainder of the bridge is provided by the multiple turn potentiometer 250. The potentiometer 250 has its opposite sides connected to a source of excitation power (FIG. 11B), consisting of an AC power source coupled to the primary winding of a transformer, the secondary winding of which is directly connected across potentiometer 250. One side of each of the resistors 311 is similarly connected to the same source of excitation power. The potentiometer 250 has its wiper mechanically connected to the gear train as described previously and forms a position feedback system. The potentiometer 250 should have a value approximately equal to eighteen times the value of a resistor 310 plus two times the value of a resistor 311.

The coarse position error signal provided by the bridge 300 is taken from the common connection of the normally open contacts of the switches 312 and from the wiper of the potentiometer 250.

The fine servo film positioning bridge 302 (FIG. 11A) differs from the coarse positioning bridge 300 in that only one set of switches are used. It will be recalled that the bridge 300 provides resolution to a group of ten frames. Thus, the bridge 302 must resolve the selection to but a single frame. Thus, ten SPST switches 320 (only six of which are shown) are provided and each has its normally open contacts connected in common with the remainder of the switches 320. Resistors 322 are interposed between the blade side of adjacent ones of the switches 320, and the junction of the resistors 322 with the blades of the switches 320 on each end of the array are connected through resistors 324 to a source of excitation power for the bridge (FIG. 11B) consisting of another secondary winding on the same transformer which powers bridge 300. The fine positioning potentiometer 252 has its opposite sides connected to the source of excitation power which is of the same phase as the excitation power applied to the bridge 300. Again, the resistors 324 are provided for centering purposes and have a value of about one-half that of one of the resistors 322. The resistance of the potentiometer 252 is approximately ten times that of a resistor 322.

The error signal is taken from the wiper of the potentiometer 252 and from the common connection of the normally open contacts of the switches 320.

The bridge circuits 300 and 302 operate in a conventional manner to provide scene selection information. As will be apparent to those skilled in the art, manipulation of the push buttons 304 and the switches 312 and 320 do not change the resistance of each bridge circuit but merely change the ratio of the resistance of one leg of the bridge to another leg of the bridge. As a result, the bridge will be unbalanced and the system will be energized in the manner to be seen hereinafter until such time as the wipers of the potentiometers 250 and 252 are moved by their mechanical interconnections into the system to balance the bridge.

Figure 11B:
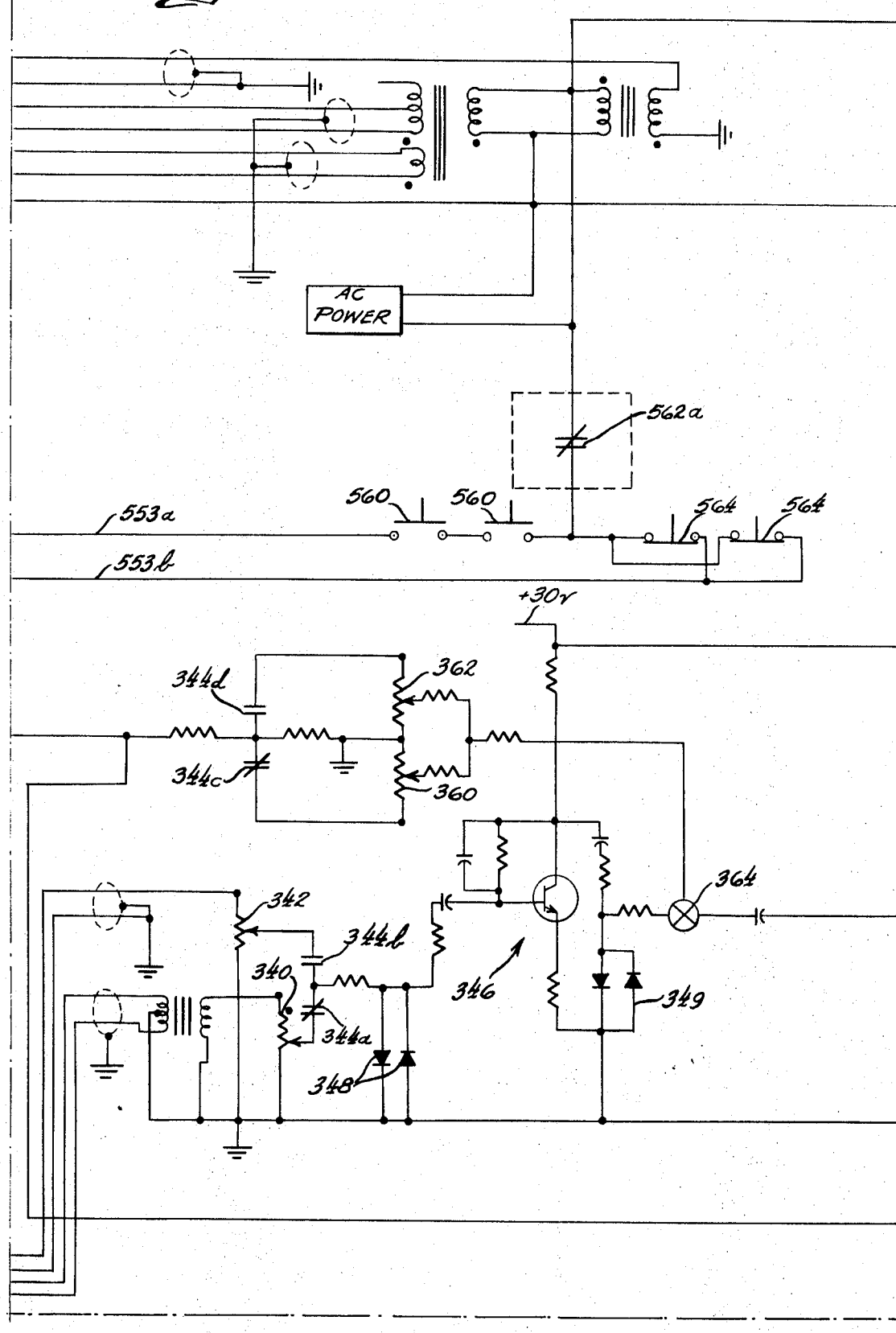

As mentioned previously, the system is designed to undergo a coarse servo positioning operation and when such is completed, the system moves to a fine servo film positioning operation. Since the coarse positioning operation will normally take place before the fine positioning operation, the system is normally conditioned for the coarse conditioning operation. Referring to FIG. 11B, both the coarse error signal and the fine error signal are fed to corresponding gain potentiometers 340 and 342. The output of the course gain potentiometer 340 is fed through the normally closed contacts 344a of a relay 344 (FIG. 11E) to the remainder of the system while the output of the fine gain potentiometer is precluded from proceeding into the system at this time by the normally open contacts 344b of the relay 344. Of course, when the system undergoes the fine positioning operation, the contacts 344a will be opened while the contacts 344b will be closed.

(2) Frame positioning drive circuit.—Any signal passing through the contacts 344a or 344b is utilized as an input to a preamplifier stage 346 that has a square wave output. It should be noted that by use of a pair of oppositely poled diodes 348, the magnitude of the input error signal is limited to the forward breakover voltage of either one of the diodes comprising the diode pair 348. A similar diode pair 349 is connected to the output of the amplifier 346 and serves to limit the magnitude of the amplified error signal in the same manner. Thus, when the amplified error signal has a relatively large magnitude, the magnitude of the error signal fed to a summing point described hereinafter is limited to the forward break-over voltage of either one of the diodes comprising the diode pairs 348 and 349. As a result, the error signal fed to the summing point will be substantially constant during the period of operation of the servo system when the magnitude of the error signal is large.

During this period, the speed of the servo motor 150 is substantially independent of the magnitude of the error signal passed through either of the contacts 344a or 344b of the relay 344 and is primarily dependent upon a signal produced by a velocity loop described hereinafter. However, when the magnitude of the amplified error signal drops below the forward breakover voltage of either one of the diodes 349 in a manner to be seen, the speed of the servo motor 150 will decrease.

It will be appreciated that the magnitude of the error signal decreases as the null point of the system is approached, and thus, it will be apparent that the arrangement just described is generally independent of the magnitude of the error signal until the null point of the system is closely approached. Because of the presence of the velocity loop and the lack of dependance of the system on the error signal except around the null point thereof, the system will run at a relatively constant high speed during most of the frame positioning process as opposed to running at a gradually decreasing speed throughout the frame positioning process as would be the case if the servo motor 150 were actuated in a manner proportional only to the error signal at all times. This feature greatly increases the speed of the system in going from one previously selected frame to a second subsequently selected frame.

A part of the velocity loop for maximizing system speed and rendering the output a speed function rather than a torque function near null as mentioned previously includes the tachometer 160 (FIG. 11A) which has a pair of connections to the AC power excitation source (FIG. 11B). The tachometer 160 is of a conventional type that receives AC power and has a sinusoidal output, the magnitude of which is proportional to the speed of rotation of the mechanical input of the tachometer. In the instant application, the phasing of the excitation source with respect to the remainder of the system is such that the output of the tachometer 160 is 180 degrees out of phase with the phase of the alternating current applied to the remainder of the system. In other words, the output of the tachometer 160 opposes the output of the bridge network 300 and 320. The output of the tachometer 160 is passed to normally closed contacts 344c of the relay 344 and normally open contacts 344d thereof. When the contacts 344c are closed, the output from the tachometer 160 is fed to a tachometer to a coarse gain potentiometer 360 while if the contacts 344d are closed, the output from the tachometer 160 is fed to a tachometer fine gain potentiometer 362. The output from the potentiometers 360 or 362 is fed to a summing point 364 which is also connected to the output of the preamplifier stage 346. It is at the point 364 where the tachometer signals and the error signals are combined.

The summed tachometer and error signals are fed as an input to a conventional AC amplifier stage 366 (FIG. 11C) the output of which is utilized as an input to a Darlington connected emitter follower 368. The output of the emitter follower 368 is then passed through a transformer 370 to a push-pull amplifier 372 which, in turn, has its output connected to a transformer 374. The output of the transformer 374 provides an amplified signal which is a combination of the error signal and the tachometer output.

The amplified output from the transformer 374 is fed to a conventional magnetic amplifier generally designated 380 (FIG. 11C) which is used together with a pair of silicon controlled rectifiers 382 and 384 to control the speed and direction of the servo motor 150. The magnetic amplifier 380 includes two outputs which are respectively associated with the cathode gate circuits of the silicon controlled rectifiers 382 and 384.

Figure 11C:
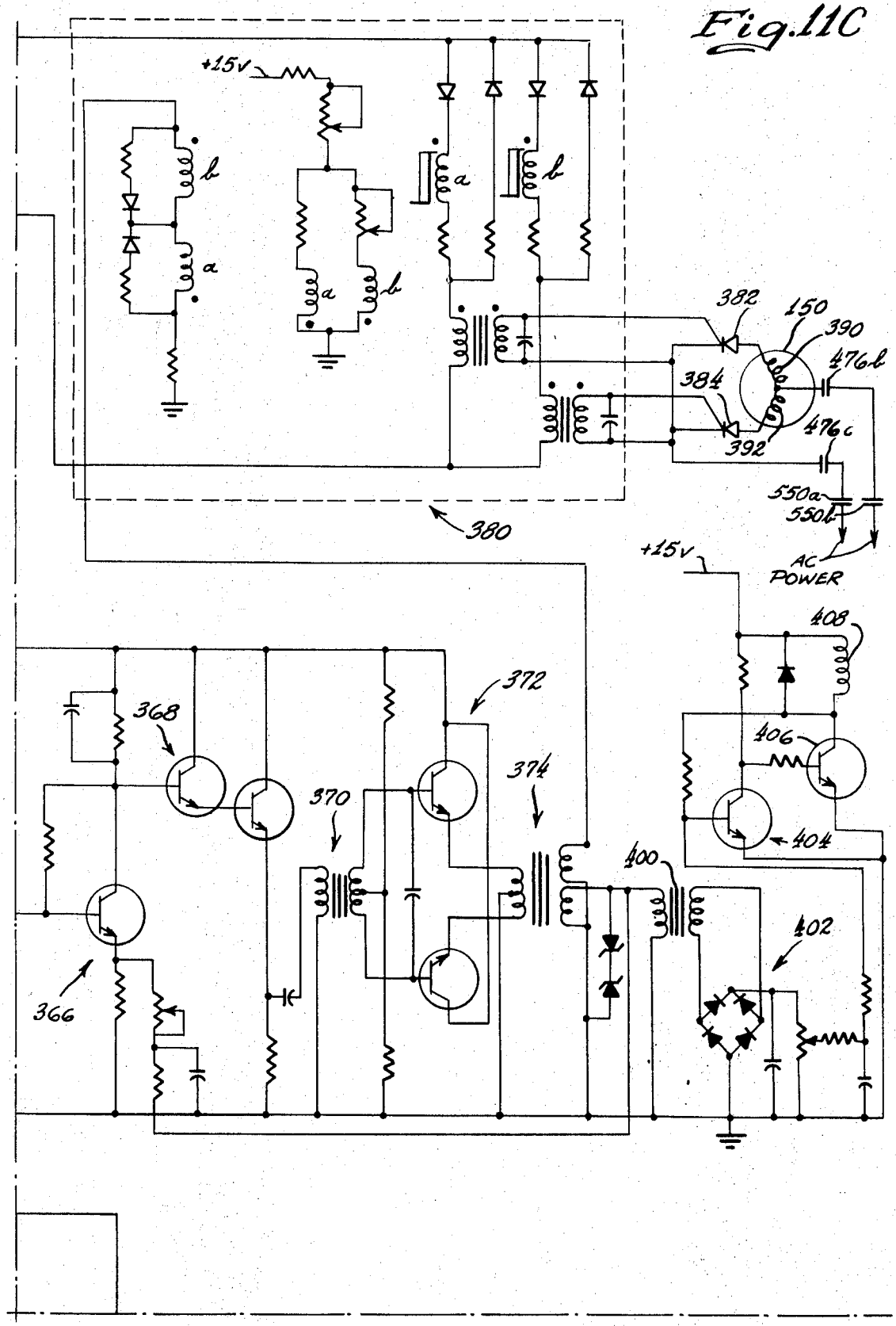
Figure 11E:
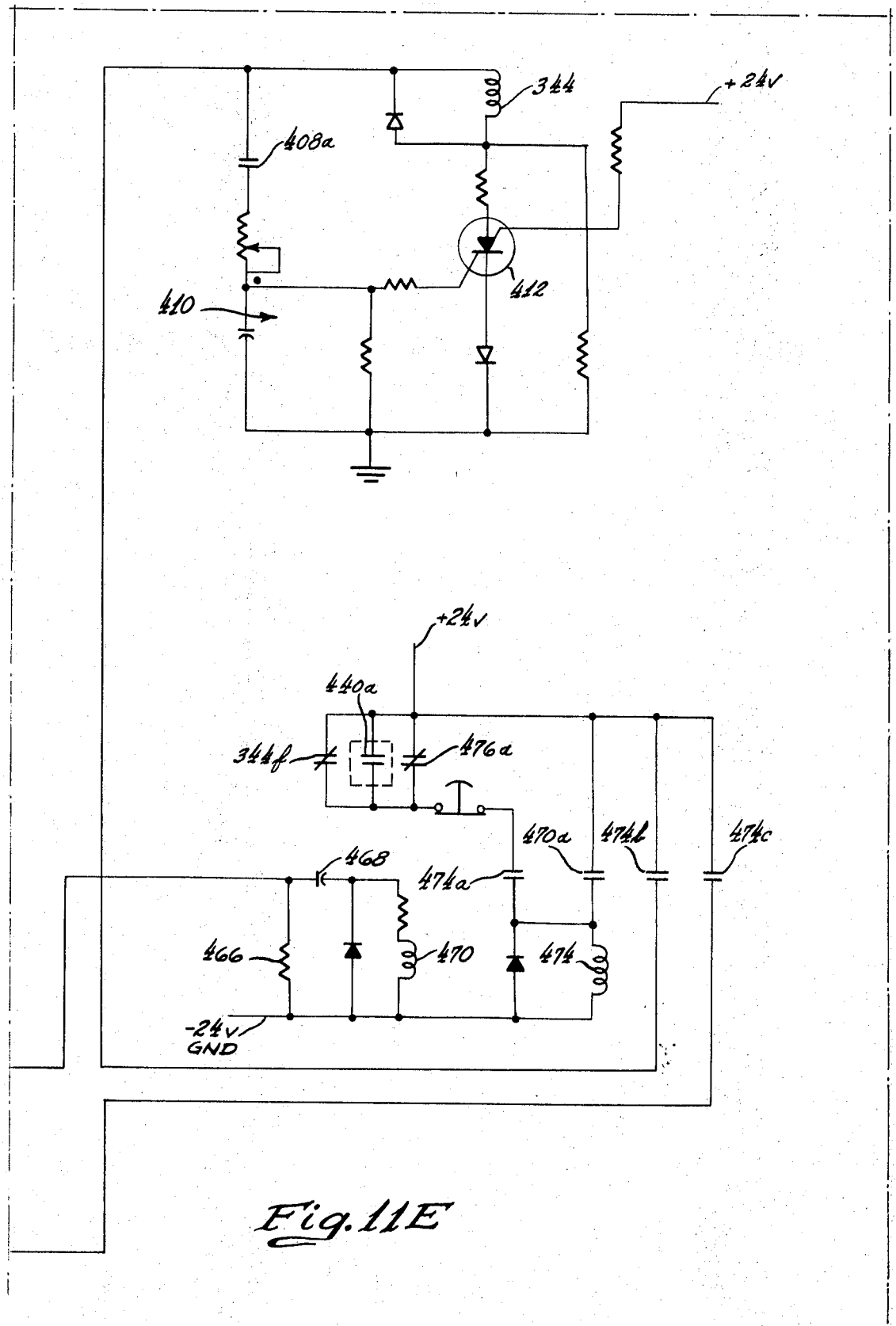

As seen schematically in FIG. 11C, the servo motor 150 has a pair of field windings 390 and 392 which have a common connection and an armature winding (not shown). The opposite side of the winding 390 is connected to the anode of the silicon controlled rectifier 382 while the opposite side of the winding 392 is connected to the anode of the silicon controlled rectifier 384. One output of the magnetic amplifier 380 is connected across the gate and the cathode of the silicon controlled rectifier 382 while the other output of the magnetic amplifier 380 is similarly connected to the gate and cathode of the silicon controlled rectifier 384. In a manner to be seen, the common junction of the two windings 390 and 392 is connected to one side of a source of AC power while the cathodes of the silicon controlled rectifiers 382 and 384 are connected in common to the opposite side of the source of AC power which is in phase with the power applied to the magnetic amplifier 380 and the bridges 300 and 302. The outputs of the magnetic amplifier 380 cause one or the other of the silicon controlled rectifiers 382 or 384 to conduct to energize one or the other of the windings 390 or 392. When the winding 390 is energized, the motor will turn in one direction while if the winding 392 is energized, the motor will turn in the opposite direction. Thus, directional control of the servo motor 150 is achieved.

In order to achieve speed control of the servo motor 150, the magnetic amplifier 380 provides shaped output pulses to one or the other of the silicon controlled rectifiers 382 and 384 to fire one or the other thereof at a predetermined point in the power cycle dependent upon the level of the output signal from the transformer 374 to the magnetic amplifier 380. Thus, when one of the silicon controlled rectifiers is made to conduct by the output of the magnetic amplifier 380 for only a small portion of each cycle, the servo motor 150 will turn at a very low speed while if one or the other of the silicon controlled rectifiers is fired for the better portion of each cycle, the motor 130 will turn at a relatively high speed. Thus, speed control of the servo motor 150 is also obtained.

(3) Transfer from coarse servo mode to fine servo mode.—The amplified combined tachometer and error signal output from the transformer 374 is also utilized to control the switching of the servo system from the coarse film positioning mode to the fine film positioning mode. The signal is fed through a transformer 400 (FIG. 11C) to a full-wave rectifier 402. The output of the full-wave rectifier 402 is utilized as an input to the base of a formerly biased transistor 404. The collector of the transistor 404 provides an input signal to the base of a second transistor 406, and is arranged as shown in FIG. 11C such that when the transistor 404 is conducting, the transistor 406 will be turned off. When a combined error and tachometer signal of a sufficient magnitude is present, the output of the rectifier 402 will maintain the transistor 404 on and thus the transistor 406 off. However, when the combined tachometer and error signal drops below a certain level as for example, when the wiper of the coarse position potentiometer 250 has been moved to a point to balance the bridge 300, the transistor 404 will no longer conduct and the transistor 406 will be turned on. Included in the collector circuit of the transistor 406 is a coil of a reed switch 408. When the transistor 406 is turned on, the reed switch 408 will be energized to thereby close contacts 408a (FIG. 11E) which, when closed, permit current to flow to an RC circuit generally designated 410. After the time constant of the RC circuit has elapsed, a silicon controlled switch 412 will be fired and will begin to conduct. The anode circuit of the silicon controlled switch 412 includes the reed switch coil 344 and as a result, conduction by the silicon controlled switch 412 will cause energization of the relay coil 344 to thereby open contacts 344a and 344c while closing contacts 344b and 344d (FIG. 11B). It will be recognized that such opening and closing of the contacts associated with the relay 344 switch the system from the coarse mode to the fine mode and further rotation of the servo motor will take place to position the film in the film projection plane within the limits of the fine positioning mode. It will be appreciated that even though the transistor 404 (FIG. 11C) may again be turned on by the switch at the end of the fine positioning mode thereby turning off the transistor 406 and deenergizing the reed switch 408 due to the amplified combined fine error and tachometer signal, the relay 344 will not be deenergized to cause a premature switch-back to the coarse mode as the silicon controlled switch 412 will continue to conduct until its anode-cathode circuit is externally broken.

(4) Transfer from fine servo mode to mechanical mode.—Before the system may switch from the fine positioning mode to the mechanical positioning mode provided by operation of the torque motor 184, the servo motor 150 must be at rest. Unless this condition is met, rotation of the shaft 176 by the torque motor 184 will move the cams 186, 192 and 194 into engagement with the followers 174 and 202 as will be apparent from an inspection of FIG. 9. Since the followers 174 are directly driven by the servo motor 150 through gearing, severe mechanical damage to the apparatus could result. Furthermore, the followers 202 are driven by film movement and interference with the followers 202 by the cams 192 and 194 would obviously cause severe damage to the film. For this reason, means are provided for sensing when the system is at rest and for insuring such a condition before rotation of the motor 184 is initiated to interpose the cams 186, 192 and 194 into the path of their respective followers.

The output of the tachometer 160 (FIG. 11A) is applied to a potentiometer 420 (FIG. 11F) which may be adjusted to set the level at which a stop is sensed. The wiper of the potentiometer 420 is connected to the base of a first transistor in an amplifier stage 422. The output of the amplifier stage 422 is applied through a transformer 424 to a full-wave rectifier 426. The rectified, amplified tachometer output is then applied to an RC circuit comprised of a pair of capacitors 428 and 430 and a resistor 432 in the form of a potentiometer. A diode 434 is connected in parallel with the resistor 432. Power is provided through normally closed contacts 344e of the relay 344 to the junction of the resistor 432 and the capacitor 430. This latter junction is also connected as an input to the base of a transistor of a Darlington connected emitter follower amplier 436. A coil of a reed swtich 440 is connected to the output of the emitter follower 436, and in general, is energized whenever the system is at rest and has been at rest for a time determined by the RC characteristics of elements 428, 430, 432 and 441.

As will be seen, the condition of the reed switch 440 is used to indicate when the system has come to a valid stop. When the system is in the coarse positioning mode and the servo motor 150 is rotating at a relatively high speed, the output of the tachometer 160 is amplified by the amplifier 422, rectified by the rectifier 426 and applied to the emitter follower 436 to maintain the reed switch 440 energized. Furthermore, the power being applied through the closed contacts 344e of the relay 344 will maintain the emitter follower 436 in an on condition to maintain the relay 440 energized.

When the system approaches the null point for the coarse positioning mode, the output of the tachometer will drop off eventually to the point where it may not maintain the emitter follower 436 in a conducting condition. At such a time, conduction is maintained by the power applied through the contacts 344e. If the system is set to switch to the fine positioning mode before the servo motor 150 comes to rest following coarse positioning, the tachometer output may not fall to a point where the emitter follower 436 will be cut off. However, it is necessary to insure that the emitter follower 436 will not be cut off even if the system does come to complete rest during the transfer from coarse positioning to fine positioning. It will be observed that the contacts 344e are opened by the relay 344 when the latter is operated to transfer from the coarse mode to the fine mode. Of course, if the system were to make a complete stop at this time, it will be apparent that the output from the tachometer 160 will not be sufficient to maintain the emitter follower 436 in a conducting condition and furthermore, a finite time may elapse before the system, now in the fine positioning mode, will attain sufficient speed to raise the tachometer output to a level sufficient to maintain the emitter follower 436 on. During such time, the charge built up on the capacitor 430 during the time when the contacts 344e were closed is sufficient to maintain the emitter follower 436 in a conducting condition. By the time the capacitor 430 is discharged sufficiently so that it is no longer capable of maintaining the emitter follower 436 on, the system will have acquired sufficient speed in the fine positioning mode so as to maintain the emitter follower 436 conducting due to the output of the tachometer 160.

When the system approaches the null point for the fine positioning mode, it is desirable to insure that the emitter follower 436 will be maintained conducting even though the output of the tachometer 160 as well as the level of the fine error signal will fall off as null is approached. To this end, the capacitor 428, which has been charged along with the capacitor 430 by the tachometer 160 during the fine positioning mode, will provide sufficient bias to the emitter follower 436 to maintain the latter on for a period of time sufficient to enable the system to achieve complete rest. The time delay between the failure of the emitter follower 436 to conduct and the drop in the level of the combined output of the tachometer 160 and the fine error signal, below the level required to maintain the emitter follower 436 conducting, may be suitably regulated by appropriate adjustment of the potentiometer 432.

From the foregoing, it will be apparent that when the system has reached the null point in the fine servo positioning mode, and after a predetermined time delay, the emitter follower 436 will be turned off thereby deenergizing the reed switch 440. The deenergization of the reed switch 440 will open normally open contacts 440a for purposes to be seen.

(5.) Positioning a selected frame in the film projection plane.—The system for initiating operation of the system will next be described. A normally open switch 460 (FIG. 11D) is connected through a normally closed reset switch 462 to a source of power. The output side of the switch 460 is connected through a solenoid 464, which may form the actuator of a conventional switch latching mechanism (not shown), to ground. The arrangement is such that when the switch 460 is closed, the solenoid 464 is energized to latch the switch 460 in the closed position until such time as the switch 462 is opened for purposes of resetting the system. When the projector is used in the aforementioned golf game environment, the switch 462 may form part of a computer for computing the flight of a golf ball and which is opened after the cycle of the computer is complete to reset the ssytem for the next ball.

The output side of the switch 460 is also connected through an RC circuit (FIG. 11E) formed of a resistor 466 and a capacitor 468 to the coil of a reed relay 470. The arrangement is such that when the switch 460 is closed, the reed relay 470 will be energized for a short period of time determined by the RC constant of the RC circuit formed by the resistor 466 and the capacitor 468 and will then be deenergized even though the switch 460 remains closed. A pair of normally open contacts 470a are closed upon the energization of the reed relay 470 to energize a relay 474. Since the reed relay 470 is only energized for a short period of time, and since, as will be seen, the relay 474 forms part of a circuit for providing power to the relay 344, it is desirable to provide a holding circuit for the relay 474. Accordingly, a pair of normally open contacts 474a are connected in series with a paralleled set of normally closed contacts 344f of the relay 344, the normally open contacts 440a of the reed relay 440 and the normally closed contacts 476a of a relay 476.

It will be appreciated that when the system is about to be energized, a frame of the film will be positioned in the film projection plane by virtue of the preceding cycle and the torque motor 164 will be energized although stalled and maintaining the shaft 156 in its extreme counterclockwise position, which, it will be recalled, causes the cams 172 and 174 to engage their corresponding followers 182 to properly tension the film. Thus, before the film can be repositioned, it is necessary to reverse the direciton of rotation of the torque motor 164 such that the film may be appropriately positioned. The microswitch 242 (see also FIG. 10) is interposed in the energizing circuit of the relay 476 (FIG. 11D) and is arranged to permit energization of the latter only when the shaft 176 has been rotated by the torque motor to its fully clockwise position. Since, at this time, the shaft 176 is not in such a position, the relay 476 will be deenergized and as a result, the contacts 476a thereof will be closed and through the contacts 474a will provide a holding circuit for the relay 474.

Energization of the relay 474 also closes normally open contacts 474b and 474c thereof. The closing of the contacts 474c cause the energization of a relay 480 which operates as the directional control for the torque motor 184. As seen in FIG. 11D, the torque motor 184 includes a pair of windings 490 and 492 which have a common junction connected to one side of a source of power. The other side of the source of power is connected to the common side of a SPDT switch having normally closed contacts 480a and normally open contacts 480b and which is operated by the relay 480. When the relay 480 is deenergized, power will be applied thru the normally closed contacts 480a to the winding 490 to cause the torque motor 184 to rotate the shaft 176 in a counterclockwise direction as seen in in FIG. 10. When the relay 480 is energized, power will be applied through a normally open contact 480b to the winding 492 to cause the torque motor 184 to rotate the shaft 176 in a clockwise direction as seen in FIG. 10.

The closing of the contacts 474c (FIG. 11E) of the relay 474 causes the energization of the relay 480 and as a result, the circuitry just described causes the torque motor 184 to rotate the shaft 176 in a clockwise direction thereby relieving tension on the film and withdrawing the various cams on the shaft 176 from positions wherein they might engage their respective followers. When the shaft 176 has reached its fully clockwise position, the torque motor 184 will stall and the cam 240 will close the microswitch 242. The microswitch 242 is in series with the relay 476 across a source of power. Normally open contacts 480c operated by the relay 480 are interposed in the serial arrangement of the microswitch 242 and the relay 476. Since at this time, the relay 480 is energized through the contacts 474c of the relay 474, the contacts 480c of the relay 480 will be closed and the relay 476 will be energized. When the relay 476 is energized, the normally closed contacts 476a (FIG. 11E) thereof will open but the relay 474 will be maintained in an energized condition by virtue of holding circuit provided through the normally closed contacts 344f and 440a of the relays 344 and 440, respectively, the relay 344 being deenergized at this time as the system is not in the fine servo positioning mode.

The energization of the relay 476 will also close normally open contacts 476b and 476c (FIG. 11C) thereof, the former connecting one side of the source of power to the common junction between the coils 390 and 392 of the servo motor, while the latter will connect the other side of the source of power to the cathodes of the silicon controlled rectifiers 382 and 384.

Since prior to the operation of the switch 460, a new scene was selected by manipulation of the push buttons 304 and the switches 312 and 320, an appropriate error signal will be applied to the magnetic amplifier 380 at this time and one of the silicon controlled rectifiers 382 or 384 will be fired by the magnetic amplifier to energize the servo motor 150. The driving of the system by the servo motor 150 will of course cause the generation of an output signal from the tachometer 160 and the system will proceed through the coarse positioning mode in the manner set forth previously.

When the system approaches the null point of the coarse positioning servo system, the reed switch 408 (FIG. 11C) will be energized in the manner described previously and after the time delay provided by the RC circuit 410 (FIG. 11E), the silicon controlled switch 412 will be turned on to energize the relay 344 which will open the normally closed contacts 344f (FIG. 11E), but the energization of the relay 474 will be maintained through the holding circuit provided by the contacts 440a of the reed switch 440 (FIG. 11F) which will have been energized by the output of the tachometer 160 during the coarse positioning mode in the manner set forth above. Additionally, it will be recalled that the energization of the reed relay 440 is maintained during the transfer from coarse positioning to fine positioning by the action of the capacitor 430.

When the system reaches the null point of the fine positioning servo system, and a valid stop of the system is detected as set forth above, the reed relay 440 will be deenergized. This will cause the opening of the contacts 440a and since the relay 344 and the relay 476 are energized at this time, the holding circuit for the relay 474 is broken and the latter will be deenergized.

As a result of the deenergization of the relay 474, the contacts 474c will open and deenergize the relay 480. As a result, the torque motor 164 will be energized through the winding 490 thereof to rotate the shaft 176 in a counterclockwise direction as seen in FIG. 10, and the mechanical positioning of the film by virtue of the action of the cam 186 will take place. As the shaft 176 continues to rotate in a counterclockwise direction, the cams 192 and 194 will cause the application of film to maintain it in a single plane within the film projection plane to eliminate the so-called "oil canning" effect.

(6) Accurately positioning the selected frame on the screen.—When the shaft 176 is rotated to its fully counterclockwise position, the microswitch 246 will be closed to initiate the final positioning procedure. As noted previously, the final positioning procedure precisely positions the projected scene on the screen at a predetermined location thereon. The closing of the microswitch 246 energizes a reed switch 510. Additionally, a timer 512 is energized.

The energization of the reed switch 510 closes contacts 510a and 510b thereof which are connected to the common junction of four photocells 511, 512, 513 and 514 to connect the latter to the coils of a pair of micropositioners 515 and 516 respectively. The photocells 511, 512, 513 and 514 comprise the photocell quadrant 38 shown in FIG. 1. The micropositioner 515 controls the horizontal positioning of the scene on the screen and the other side of the coil thereof is returned to the wiper of a potentiometer 518. A source of DC power 520 is connected across the potentiometer 518 and the photocells 511 and 513 are similarly connected across the potentiometer 518. The resulting assemblage is that of a DC bridge with the power source 520 providing the excitation current.

The coil of the micropositioner 516 is connected to the wiper of a similar potentiometer 522 which has a similar DC power source 524 connected thereacross. Similarly, the photocells 512 and 514 are also connected across the potentiometer 522 to form a second DC bridge circuit.

If it be assumed that the scene is properly positioned on the screen when the spot of light equally illuminates the photocells 511, 512, 513 and 514, then it will be apparent that the system will be electrically balanced when the wipers of the potentiometers 518 and 522 are placed at the midpoint thereof and when the spot of light falls equally on all four of the photocells. If the horizontal registration of the spot of light is such that more light is falling on the photocell 511 than on the photocell 513, it will be apparent that an imbalance is created in the bridge and as a result, a direct current will flow in one direction through the micropositioner 515 to cause the latter to close through contacts 515a thereof. This will cause a winding 530 of the motor 110 to be energized to drive the motor in one direction. As a result of the energization of the motor 110 in the appropriate direction, the entire drive housing 71 of the projector will be shifted in the linear and radial bearings 102 and 104 in that direction with the result that the spot of light will also be shifted in that direction. When the drive housing 71 has been shifted sufficiently to cause the spot of light to fall equally on the photocells 511 and 513, the bridge will be balanced and the micropositioner 515 deenergized and the circuit to the motor 110 will no longer be closed through the contacts 515a. As a result, the motor 110 will be deenergized and movement of the housing 71 will be stopped such that the latter is in a position corresponding to horizontal registry of the projected scene on the screen.

Had the spot of light been illuminating the photocell 513 more than the photocell 511, it will be apparent that the direction of current flow through the micropositioner 515 due to the imbalance would have been in the opposite direction from that just described and the latter would have closed through the contact 515b thereof. In such a case, a winding 532 of the motor 110 would have been energized rather than the winding 530 and the motor 110 would have been driven in the opposite direction to move the housing 71 in the opposite direction until horizontal registry was obtained.

The control over the vertical motor 118 provided by the micropositioner 516, the potentiometer 522 and the photocells 512 and 514 is identical to that just described, the only difference being that the motor 118 is arranged to pivot the housing 71 within the radial and linear bearings 102 and 104 to bring about vertical registry of the projected scene.

In order to preclude prolonged "hunting" of the servo system just described, the timer 512 is arranged to close a switch 534 after a short period of time has elapsed from the energization of the timer 512 due to the closing of the microswitch 246. Typically, the time period is of a magnitude of about three seconds and when the switch 534 is closed, the reed relay 510 is shunted and thereby deenergized to open the contacts 510a and 510b to preclude current flow through either of the micropositioners 515 or 516. A protective resistor 536 is inserted in the circuit to protect the power supply for the reed relay 510 when the latter is shunted.

(7) *Selecting and positioning another frame.*—At this point, a selected scene has been programmed into the device by manipulation of the push buttons 304 and the switches 312 and 320 and has been positioned within the film projection plane by virtue of the system progressing through two servo positioning modes, a mechanical positioning mode and finally, the projected scene is aligned vertically and horizontally on the screen by virtue of a final servo positioning operation. When the projector is used in conjunction with the golf game, the golfer may then hit a ball in an appropriate manner, and data relative to the trajectory of the ball is gathered and fed to a computer before the trajectory of the ball is computed. When the computer has completed its cycle and provided the golfer with information relative to the trajectory of his ball, the switch 462 (FIG. 11D) may be opened automatically. Of course, if the projector is used in another environment, other means may be used for automatically opening the switch 462 or, if desired, it may be opened manually. The opening of the switch 462 deenergizes the solenoid 464 which releases the switch 460 to an opened position. At this point, the next scene that is desired to be displayed on the screen may be selected through appropriate manipulation of the push buttons 304 and the switches 312 and 320 and when such is completed, the switch 460 may be again closed and the just described operation will again be performed.

(8) *Safety features.*—In view of the high speed of the system as mentioned previously, it is desirable that a number of safety devices be provided in order to preclude damage to the drive system and/or the film. Thus, a pair of normally open contacts 550a and 550b (FIG. 11C) of a relay 550 (FIG. 11D) are interposed in the power lines for the circuit including the silicon controlled rectifiers 382 and 384 and the servo motor 150 (FIG. 11C) which, it will be recalled, drives the entire system. The relay 550 is connected in a full-wave rectifier circuit generally designated 552 and one side of a source of power is connected thereto through a pair of normally closed limit switches 554 and 556 which may be associated with the dancer arms 48 and 50 respectively. When one of the dancer arms 48 or 50 are abutting one of the stops 60 or 62, the corresponding one of the limit switches 554 or 556 will be opened to preclude energization of the relay 550 and thus the supplying of power to the servo motor 150. It will be apparent that such a requirement is necessary in that when a dancer arm is in the position such as that shown in FIG. 1 with regard to the dancer arm 48, the driving of the film 30 from the reel 44 to the reel 46 will tend to break the film 30 as the position of the dancer arm 48 is such as to preclude even a slight initial movement thereof in response to energization of the system. Thus, in order to preclude breakage of the film 30 in such an instance, the limit switches 554 and 556 are provided.

The opposite side of the full-wave rectifier circuit 552 is returned to the opposite side of the source of AC power through a pair of lines 553a and 553b, the latter including a normally open contact 550c of the relay 550. The line 553a is used for start-up and is connected through the series arrangement of a pair of normally open switches 560 (FIG. 11B) and the normally closed contacts 562a of a relay 562 (FIG. 11F) to the source of AC power. The line 553b including the contacts 550c is returned through a pair of normally closed switches 564 which are connected in parallel with each other to the common junction of the switches 560 with the contacts 562a. The arrangement is such that when the relay 562 is deenergized and thus the contacts 562a are closed, the closing of both of the switches 560 will cause initial energization of the relay 550 provided of course that the limit switches 554 and 556 are closed. Energization of the relay 550 closes the contacts 550a and 550b thereof to provide power to the servo motor 150 when and if the system requires it while the closing of the contacts 550c in response to the energization of the relay 550 provides a holding circuit for the latter through the switches 564. The system may be stopped by interrupting the holding circuit by simultaneously opening both of the switches 564. Two each of the switches 560 and 564 are utilized to preclude the stopping or the starting of the system by a person not sufficiently familiar with its operation, the assumption being that a person familiar with the operation of the system and qualified to operate it will know that both of the switches 560 must be depressed simultaneously to start the system and both of the switches 564 must be opened simultaneously to stop the system.

Still another safety feature is provided in an overspeed system to automatically shut down the system in the event that the servo motor 150 begins to run at too great a speed. Because of the mechanical drive of the system, it will be appreciated that tolerances of the various gears limit the maximum speed at which the system can operate. When such a speed is exceeded, "backlash" may occur among the various gears and the various drive sprockets may get slightly out of synchronization with each other. When such a lack of synchronization occurs, the sprockets may tend to rip the film and thereby destroy its usefulness.

Figure 11F:
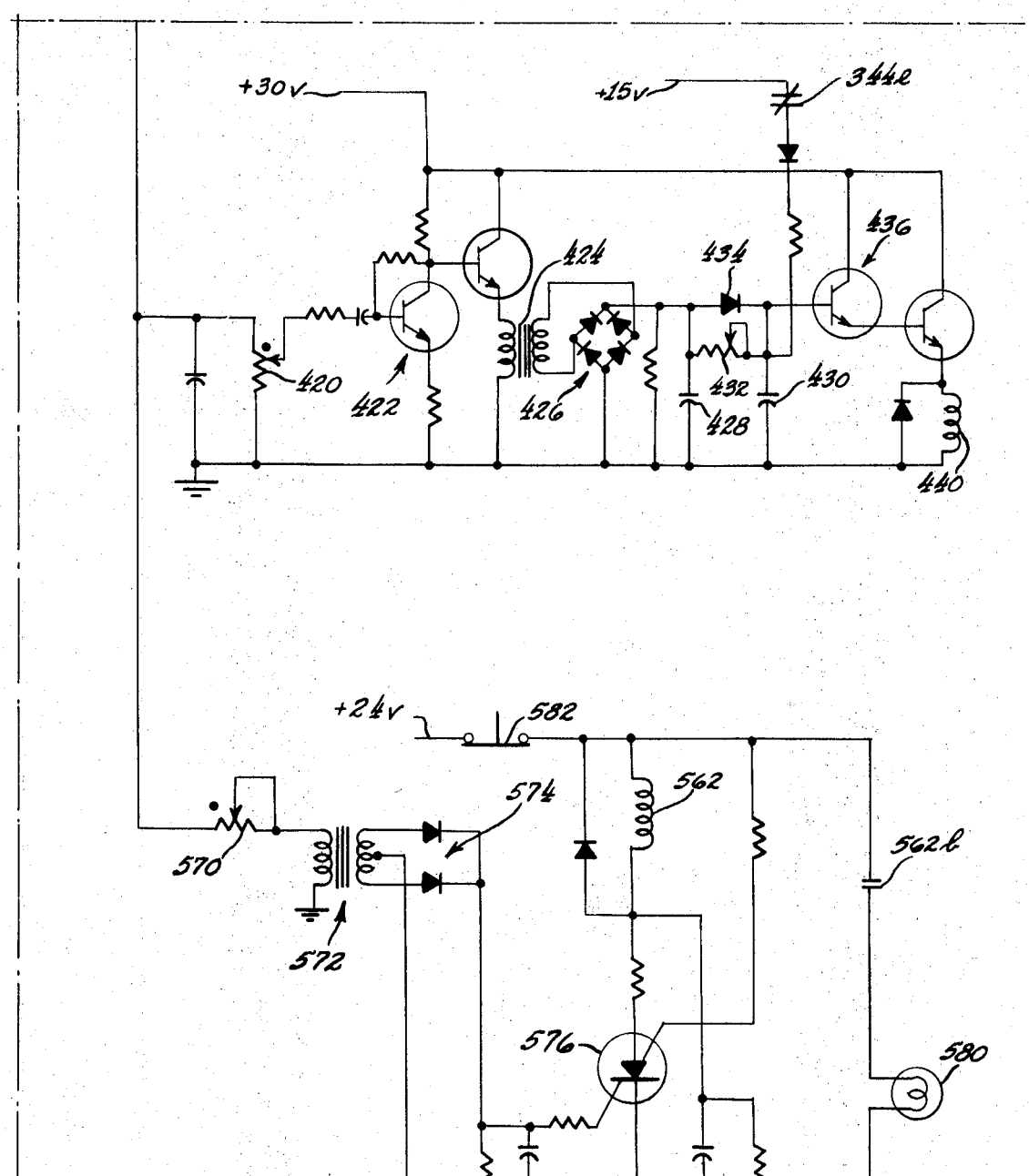

In order to detect when the speed of the system begins to approach the maximum permissible level, the output of the tachometer 160 is applied to a potentiometer 570 (FIG. 11F). The potentiometer 570 may be adjusted such that the level of the tachometer signal provided to the remainder of the overspeed system can be set at any desired level corresponding to a particular speed. The output from the potentiometer 570 is run through a transformer 572 to a full wave rectifier 574. The rectified tachometer signal is then applied to a cathode gate of a silicon controlled switch 576. The relay 562 is connected across a source of DC power in the anode-cathode circuit of the silicon controlled switch 576 and when the level of the rectified tachometer signal reaches a certain point indicating that the speed of the system is tending to exceed the maximum permitted value, the silicon controlled switch 576 will be fired and as a result, the relay 562 will be energized.

The energization of the relay 562 will open the normally closed contacts 562a (FIG. 11B) thereof to thereby interrupt the holding circuit for the relay 550 (FIG. 11D). It will be recalled that when the relay 550 is deenergized, the contacts 550a and 550b (FIG. 11C) thereof are opened such that the servo motor 150 cannot be connected to power. Thus, when the silicon controlled switch 576 (FIG. 11F) is turned on by the level of the tachometer output exceeding a value indicative of the maximum permitted speed of the system, the servo motor 150 will be deenergized.

Normally open contacts 562b are closed upon the energization of the relay 562 to illuminate a light 580 to indicate that the system has been shut down due to an overspeed condition.

In order to reset the system, it is necessary to deenergize the relay 562. In order to do such, a manually operated normally closed switch 582 is provided in series with the relay 562 and the silicon controlled switch 576 across the source of power. When the reset switch 582 is manually opened, the anode-cathode circuit of the silicon controlled switch 576 is broken and the latter will not again conduct until the system is reenergized and the tachometer 160 has an output indicative of an over-speed condition.

From the foregoing, it will be apparent that the invention provides a high speed projection system that is susceptible to use in many different environments. As will be apparent to those skilled in the art, numerous modifications to the system may be made. For example, it has been mentioned that where the projection system is used in environments that do not require the accurate positioning of a projected image at a predetermined location on a screen, the third and final mode of film positioning may be eliminated. Furthermore, it will be apparent that it is not necessary to use a film strip having a scene portion and a separate aligning portion for the third positioning mode in that the same result could be achieved by placing the optical discontinuity at any desired location on the scene portion rather than by placing it on a separate aligning portion.

Additionally, it will be apparent that by using electrical components of a higher quality or by reducing the number of frames from which selection can be made, one of the two steps of positioning within the first or servo positioning mode could be eliminated. Similarly, if a greater number of frames or lesser quality components were to be used, additional servo positioning steps within the first on servo positioning mode could be used.

Finally, it will be apparent that the system is not limited to manual scene selection; but, if desired, electronic switches operated by a computer or the like could be used in place of the manually operated switches. Similarly, it will be apparent that the legs of the bridge network formed by the switches and the resistor matrices could be replaced by a suitable potentiometer that would have its wiper positioned in response to a computer output or the like.

While an illustrative embodiment of the invention has been illustrated in the drawings and described in detail above, the invention is susceptible of embodiment in many different forms other than that enumerated, and it should be understood that the present disclosure is to be considered as an exemplification of the principles of the invention and is not intended to limit the invention to the embodiment illustrated and described. The scope of the invention will be pointed out in the following claims.

We claim:

1. A still-life scene projecting device comprising: a source of light; lens means for focusing a still-life scene to be projected on a screen, said source of light and said lens means defining a projection station whereat any one of a plurality of still-life scenes may be disposed for projection on the screen; and means for positioning a selected one of said plurality of still-life scenes at said projection station such that said selected one of said scenes is projected on the screen, said positioning means comprising scene selection means for selecting one of said plurality of scenes for disposition at said projection station; first means responsive to said scene selection means for positioning said selected scene in close proximity to said projection station; second means operable when said selected scene is in close proximity to said projection station for accurately positioning said selected scene at said projection station so that said selected scene will be projected on said screen, and third means operable when said selected scene is accurately positioned at said projection station for positioning the projected image of the selected scene at a pre-determined location on the screen.

2. The scene projecting apparatus of claim 1 wherein said scene selection means includes manually operable means.

3. The scene projecting apparatus of claim 1 wherein said first means comprises a first servo system for providing coarse positioning of said film and a second servo system for providing a fine positioning of said film.

4. The scene projecting apparatus of claim 1 wherein said plurality of scenes are on a film and said second means comprises sprocket means adapted to engage said film in a pre-determined orientation with respect to each scene thereon, and cam means for moving said sprocket means to cause said accurate positioning of said film at said projection station.

5. The scene projecting apparatus of claim 1 wherein said third means comprises sensing means remote from said projection station for detecting the position of the projected image of said selected scene, and means responsive to said detecting means for positioning said projected image on the screen at said pre-determined location.

6. A still-life scene projector comprising, in combination:
(a) a source of light,
(b) means defining a scene projection station and adapted to receive a scene to be projected,
(c) lens means operatively associated with said light source and said scene projection station for projecta scene,
(d) storage means for storing a plurality of scenes for selective projection,
(e) scene transport means operatively associated with said storage means and said scene projection station for moving a selected scene to and from said storage means and said scene projection station, said scene transport means including at least one element movable therewith to a plurality of unique positions, each position being representative of a different one of said plurality of scenes,
(f) input means for providing a first electrical signal having a characteristic variable to represent any one of a plurality of groups of scenes within said plurality of scenes and a second electrical signal having a characteristic variable to represent a single scene within each said group of scenes,
(g) means operated by said movable element for providing a third electrical signal having a characteristic representing the group of scenes in close proximity to said projection station and a fourth electrical signal having a characteristic representing the single scene within said last-named group at said projection station,
(h) drive means for said scene transport mechanism, and
(i) control means for said drive means including means for comparing said first and third signals and operating said drive means in response to any difference therebetween to cause a selected group of scenes to be located in close proximity to said projection station and means for comparing said second and fourth signals to cause a selected frame within said selected group to be located at said scene projection station, said second and fourth signal comparing means being operative after said selected group of scenes is located in close proximity to said projection station.

7. The projector of claim 6 further including cam means associated with said transport mechanism for causing the same to accurately locate the selected frame within said projection station, motor means for said cam means and means responsive to the completion of operation of said drive means following comparison of said second and fourth signals for operating said motor means.

8. The still-life projector of claim 6 wherein said input means includes a first resistive matrix for providing said first electrical signal and a second resistive matrix for providing said second electrical signal; and said means operated by said movable element comprises a first potentiometer for providing said third electrical signal and a fourth potentiometer for providing said fourth electrical signal; said control means includes means interconnecting said first resistive matrix and said first potentiometer to provide a first electrical bridge, and means interconnecting said second resistive matrix and said second potentiometer to form a second electrical bridge, means for operating said drive means in response to an imbalance in said first electrical bridge, means for operating said drive means in response to an imbalance in said second electrical bridge, and means responsive to the approximate balancing of said first electrical bridge for causing said drive means to be operated in response to an imbalance in said second electrical bridge.

9. The system of claim 6 wherein the information on said scenes is adapted to be projected on a screen by said lens means and wherein said plurality of scenes are disposed on a film strip, and further including means on either side of said projection station adapted to engage said film strip and for acting equally thereon in opposite directions away from said projection station to tension the portion of said film strip at said projection station thereby precluding distortion of the image projected on the screen.

10. The system of claim 9 wherein said means for acting on the film strip comprises first and second idlers on opposite sides of said frame projection station, first and second sprockets for engaging said film strip and operatively associated with said first and second idlers respectively, and means for applying equal and opposite rotative forces to said first and second sprockets.

11. A projection system especially adapted for use with film strip having a plurality of scenes thereon according to claim 6 wherein said drive means comprises a motor, said control means further including means responsive to the speed of said motor and operable in conjunction with said comparing and actuating means for actuating said motor in a manner maximizing the speed of response of the system to operation of said input means.

12. The projector system of claim 11 further including means responsive to the speed of said motor for disabling said system when the speed of said motor exceeds a predetermined speed.

13. The still-life projector of claim 6 further including means remote from said projection station for sensing the position of the projected visual information of said selected scene, means associated wtih said sensing means for determining whether said projected visual information is properly positioned at a predetermined location with respect to said sensing means, and means responsive to said determining means for shifting the position of the projected visual information with respect to said sensing means to properly position the projected visual information at said predetermined location with respect to the sensing means.

14. A film strip projector for projecting the visual information contained on frames on a film strip comprising: a source of light; an optical system oriented with respect to said source of light to define a projection station therewith; means for moving the film strip so as to position a frame thereon at said projection station; and means for placing the portion of the film strip at said projection station in a predetermined configuration without slidably contacting the film strip, said last-named means comprising guide means mounted for rotation in response to movement of the film strip for engaging the film strip and shaped according to said predetermined configuration, tensioning means on either side of said projection station for engaging the film strip to place the latter under tension and cause it to conform to a portion of the shape of said guide means, whereby distortion of the projected visual information is precluded, and means responsive to said moving means for actuating said tension means when a selected frame is positioned at said projection station.

15. The projector of claim 14 wherein said tensioning means comprise a pair of sprockets, one on each side of said projection station, and means for rotating said sprockets a predetermined degree in directions tending to draw the film strip out of said projection station thereby tensioning the film strip.

16. The projector of claim 14 wherein said moving means comprise at least one sprocket for engaging the film strip, a cam follower operatively associated with said sprocket, a rotatable cam shaft, and a film strip moving cam mounted on said shaft and adapted to engage said cam follower to move the latter thereby moving said sprocket to position a frame on the film strip at said projection station.

17. The projector of claim 16 wherein said tensioning means comprises a pair of sprockets for engaging the film strip on opposite sides of said projection station, and cam means for rotating said sprockets a predetermined degree in directions tending to draw the film strip out of the projection station, said cam means including at least one film strip tensioning cam mounted on said cam shaft for engagement with a cam follower associated with said pair of sprockets and arranged on said cam shaft with respect to said film strip moving cam such that the latter will engage its respective cam follower to cause movement of the film strip to position a frame at said projection prior to the engagement of said film tensioning cam with its respective cam follower whereby tensioning of the film strip will take place after the positioning thereof.

18. In a film strip projector including a source of light; means defining a path of movement for a film strip; an optical system for focusing and projecting visual information contained in frames on the film strip on a screen; an unobstructed area along said path and between said source of light and said optical system being free from film strip contacting elements and providing a projection station; and further including means for moving said film strip along said path to locate a selected frame at said projection station; a means for precluding distortion of the visual information projected on the screen comprising first and second movable means spaced along said path for engaging said film strip, said unobstructed area being located between said first and second movable means; means for moving said first and second movable means to cause each to tend to draw the film strip through said unobstructed area in opposite directions along said path whereby the film strip is tensioned to maintain it in a predetermined configuration and preclude distorion of the visual information projected therefrom; and means responsive to the completion of operation of said film strip moving means for actuating said last-named moving means.

19. The projector of claim 18 wherein said last-named means comprise cam follower means associated with said first and second movable means, cam means for engaging said cam follower means, and means for moving said cam means.

20. In a film strip projector having a projection station through which a film strip having a plurality of frames thereon may be moved to have the visual content of a selected frame displayed on a screen, the combination comprising: first means for moving the film strip through said projection station, said first moving means including at least one sprocket adapted to engage the film strip in a predetermined relation with each frame on the film strip and first means for driving said sprocket; second moving means for moving the film strip in said projection station to accurately locate a selected frame thereon within said projection station, said second means including said sprocket and second driving means for driving said sprocket; and means for precluding simultaneous operation of said first and second driving means.

21. The projector of claim 20 wherein said second driving means comprises cam follower means operatively associated with said sprocket in a predetermined relation therewith and arranged such that said sprocket will move in response to movement of said cam follower means, and cam means positioned to engage and move said cam follower means when said selected frame is not accurately located within said projection station.

22. The projector of claim 20 further including means responsive to the termination of operation of said first driving means for initiating operation of said second driving means.

23. The projector of claim 22 wherein said initiating means comprises time delay means, means for sensing when the operation of said first driving means has terminated and for actuating said time delay means, and means operated by said time delay means after a predetermined time period has elapsed for actuating said second drive means.

24. In a scene projection system, the combination comprising:
  (a) a screen adapted to receive any one of a plurality of different scenes,
  (b) a plurality of different still-life scenes,
  (c) a still-life projector, including means defining a projection station, for projecting scenes disposed in said projection station on said screen,
  (d) storage means for storing said plurality of scenes,
  (e) moving means operatively associated with said storage means and said projection station for moving selected scenes to and from said storage means and said projection station,
  (f) control means for said moving means including means for selecting a particular one of said plurality of scenes and for operating said moving means to move said particular one scene to said projection station, and
  (g) means remote from said projection station and responsive to the completion of operation of said moving means for thereafter sensing the location of the projected image of at least a portion of said scene with respect to a predetermined location on said screen and for moving at least a portion of said projector until said projected image portion is at a predetermined location thereby accurately locating the projected scene at a predetermined location on the screen.

25. The invention of claim 24 wherein said predetermined portion of said scene includes an optical discontinuity precisely located at a predetermined position thereon, said projector further including lens means; one of said projection station and said lens means being movably mounted and movable responsive to said sensing means.

26. The scene projection system of claim 24 wherein said control means includes input means for providing an electrical signal representing a particular scene to be projected and said moving means includes a scene transport mechanism and electrical motor means for driving the same, said electrical motor means responsive to said signal for stopping said transport mechanism to approximately locate the selected scene at said projection station and means responsive to the approximate locating of a selected scene in said projection station by said electrical motor means and transport mechanism for accurately locating said selected scene in said projection station, said accurate locating means including cam means operatively associated with said transport mechanism.

27. A scene projection system according to claim 26 wherein said plurality of scenes are on a film strip and said film transport mechanism includes at least one rotatably mounted sprocket engaging said film strip in a predetermined relation to each scene thereon so that the degree of rotation of said sprocket is indicative of the position of said film strip and each scene thereon with respect to said projection station, said control means further including means for sensing the degree of rotation of said sprocket and providing an electrical signal representative thereof, means for comparing the electrical signals provided by said input means and said sprocket position sensing means and means responsive to a difference between said electrical signals for causing said electrical motor means to drive said sprocket to position the selected scene at said film projection station.

28. The scene projection system of claim 27 wherein said input means provides two electrical signals, one representing a group of the plurality of scenes and the other representing a single scene within said group; and said sprocket position sensing means provides two electrical signals, one representing a group of scenes within said plurality of scenes and the other representing a scene within said group thereby providing coarse and fine scene selection and scene positioning signals; said comparing means being operative to first compare said group of scenes representing signals and thereafter, said single scene within the group signals.

29. The projection system of claim 25 wherein at least a portion of said projector is mounted for movement in two different directions and said sensing and moving means comprises first means for moving said portion in one of said directions and second means for moving said portion in the other of said directions.

30. The projection system of claim 29 wherein said sensing and moving means comprise a pair of electrical bridge circuits each including a light sensitive component, said first moving means being responsive to an electrical imbalance in one of said bridge circuits and said second moving means being responsive to an electrical imbalance in the other of said bridge circuits.

31. A projection system for selecting any one of a plurality of frames and for projecting the image of a selected frame on a screen comprising: a projector including a projection station at which a selected frame is disposed to have the image thereof projected on a screen; first moving means for moving a selected frame to said projection station; first control means for controlling said first moving means comprising a first servo system for providing coarse control of said first moving means; a second servo system for providing fine control of said first moving means; means responsive to the substantial completion of operation of said first servo system for transferring control of said first moving means from said servo system to said second servo system; second moving means for moving a selected frame to said projection station and accurately locating the same thereat; and second control means for controlling said second moving means and operable in response to completion of operation of said second servo system to cause said second moving means to accurately locate a selected frame at said projection station.

32. The projection system of claim 31 wherein said moving means comprises a motor and said servo systems include means responsive to the speed of said motor for providing a first signal proportional to the speed thereof, means for providing a second signal proportional to the position of a selected frame with respect to said projection station, means for limiting the magnitude of said second signal to a predetermined magnitude to provide a third signal; means for summing said first and third signals to provide a combined signal; and means responsive to said combined signal for energizing said motor in a manner proportional to said combined signal to control the speed of said motor; whereby when the magnitude of said second signal is greater than said predetermined magnitude, the speed of said motor will be substantially independent of said second signal and dependent on said first signal to thereby maximize the speed of said motor and thus the rate of response of said servo systems.

33. The projection system of claim 32 further including means for receiving said first signal and responsive to said first signal exceeding a predetermined level for disabling said motor whereby said projection system will be shut down when the speed of said motor exceeds a predetermined speed at which said projection system may safely operate.

34. The projection system of claim 31 wherein said second control means includes means for providing a predetermined time delay between the completion of operation of said second servo system and the actuation of said second moving means whereby simultaneous operation of said first and second moving means is precluded.

35. In an indoor golf game having a screen adapted to receive the projected image of any one of a plurality of different still-life scenes representing the view from different portions of a golf hole, a T area disposed forwardly of said screen from which a golfer may observe the projected image of said scenes and hit a ball towards said screen, ball spot projecting means for projecting a spot of light on said screen in a manner to simulate the trajectory of the flight of a ball hit from said T area, said ball spot projecting means being adapted to be operated by a computer, projecting means for projecting any one of a plurality of still-life scenes representing the view from various portions of a golf hole on said screen and means for operating said projecting means to cause the same to project the image of a selected scene on the screen, the improvement comprising: means for sensing the location of the projected image of said selected scene on said screen with respect to a predetermined position thereon and means responsive to said sensing means for causing said projection means to locate the projected image of said selected scene at said predetermined position whereby said ball spot projector and said projection means accurately depict the trajectory of a ball hit from the T area on the projected image of the selected scene representing a portion of a golf hole for observation by a golfer.

36. An indoor golf game according to claim 35 wherein said means for operating said projecting means includes scene selection means for selecting a particular one of the plurality of still-life scenes for projection on the screen, scene storage means, and means responsive to said selecting means for transporting the selected scene from said storage means to said projecting means to cause the same to project the selected scene on the screen; and further including means for disabling said sensing means during operation of said scene transporting means.

37. An indoor golf game according to claim 36 wherein said projecting means includes a projection station whereat a selected scene to be projected is disposed for projection on the screen, and said sensing means is located remotely from said projection station in a position to receive at least a portion of the projected image of a selected scene disposed at said projection station; and said means responsive to said sensing means include means mounting at least a portion of said projecting means for movement in two differing directions, means for moving at least said portion of said projecting means in said two differing directions and control means for said moving means operatively associated with said sensing means.

38. An indoor golf game according to claim 37 wherein said moving means comprise two motors, one of said motors being arranged to move at least said portion of said projecting means in one of said directions and the other one of said motors being arranged to move at least said portion of said projecting means in the other of said directions; said sensing means comprising at least two photo-sensitive elements; and said control means comprise two electrical circuits, one for each of said motors; one of said photo-sensitive elements being included in one of said electrical circuits and the other of said photo-sensitive elements being included in the other of said electrical circuits.

39. In a film strip projector including storage means for storing the film strip, a light source and optical system operatively associated therewith for projecting a scene on said film strip when a scene is located at a projection station, and a high speed film drive mechanism for moving a selected scene from said storage means to said projection station, the improvement for preventing distortion of the projected image due to improper film configuration comprising a pair of means, one on either side of said film projection station for engaging the film strip on both sides of said projection station; means for causing both sides of the film strip engaging means to simultaneously attempt to move the film strip away from the projection station in opposite directions thereby placing at least that portion of the film strip located in the projection station in tension to cause the film in said projection station to maintain a predetermined configuration thereby eliminating distortion of the projected image; and means responsive to the conclusion of operation of said film drive means for actuating said last-named means.

40. In a system for selecting and displaying visual information disposed on any one of a plurality of frames of film, the combination of: a source of light; an optical system; a stationary screen for receiving a projected image; means defining a projection station between said source of light and said optical system; storage means for storing a plurality of frames of film; first means including a first driving device, for moving any one of said plurality of frames from said storage means to said projection station for projection of at least part of the information thereon on said screen; control means for said first moving means including random selection means for causing said first means to move a selected frame of said plurality of frames to said projection station from said storage means, said control means being adapted to receive information relative to the identity of a particular one of said plurality of frames and in response thereto energize said first moving means until the same disposes the particular one of the frames of film at said projection station and thereafter deenergize said first moving means; second means for moving one of said optical system and said projection station relative to said screen in two differing directions including a second driving device for causing movement of one of said optical system and projection station in one of said directions and a third driving device for causing movement of one of said optical system and said projection station in the other of said directions, and control means for said second and third driving devices.

References Cited

UNITED STATES PATENTS

| 2,472,143 | 6/1949 | Briskin | 352—158 |
| 2,807,188 | 9/1957 | Badgley | 352—77 |
| 2,192,987 | 3/1940 | Runge | 352—163 |
| 2,563,892 | 8/1951 | Waller et al. | 352—70 |
| 2,653,508 | 9/1953 | Whiteley | 352—92 |
| 3,273,450 | 9/1966 | Ede et al. | |
| 3,354,776 | 11/1967 | Smitzer. | |

NORTON ANSHER, Primary Examiner

R. M. SHEER, Assistant Examiner

U.S. Cl. X.R.

352—158, 163; 353—95, 99